US012601600B2

(12) United States Patent
Yankov et al.

(10) Patent No.: US 12,601,600 B2
(45) Date of Patent: Apr. 14, 2026

(54) INTERPRETING AND RESOLVING MAP-RELATED QUERIES USING A LANGUAGE MODEL

(71) Applicant: Microsoft Technology Licensing, LLC, Redmond, WA (US)

(72) Inventors: Dragomir Dimitrov Yankov, Palo Alto, CA (US); Chiqun Zhang, Sunnyvale, CA (US); Antonios Karatzoglou, San Francisco, CA (US); Helen Alta Craig, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 18/242,360

(22) Filed: Sep. 5, 2023

(65) Prior Publication Data

US 2025/0076059 A1 Mar. 6, 2025

(51) Int. Cl.
G06F 40/00 (2020.01)
G01C 21/34 (2006.01)
(Continued)

(52) U.S. Cl.
CPC ... G01C 21/3407 (2013.01); G06F 16/24545 (2019.01); G06F 16/2462 (2019.01);
(Continued)

(58) Field of Classification Search
CPC .. G06F 16/29; G06F 16/284; G06F 16/24545; G06F 16/2462; G06F 16/325;
(Continued)

(56) References Cited

U.S. PATENT DOCUMENTS 6,256,577 B1 * 7/2001 Graunke .......... G08G 1/096861
701/414
2004/0088107 A1 * 5/2004 Seligmann ............. G01C 21/36
709/224
(Continued)

FOREIGN PATENT DOCUMENTS

EP 1657693 A2 * 5/2006
EP 3748302 A1 * 12/2020
WO WO2019100279 A1 * 5/2019

OTHER PUBLICATIONS

Álvaro J. Jiménez Palenzuela et al., "Modeling Second Language Acquisition with pre-trained neural language models", Expert Systems With Applications, vol. 207, Nov. 30, 2022.*
(Continued)

*Primary Examiner* — Srirama Channavajjala

(57) ABSTRACT

A technique for interacting with map-related information integrates the use of a machine-trained language model. Upon submission of a query, the technique uses the machine-trained language model to assess at least one intent associated with the query. The technique then invokes an intent-specific processing flow to provide an output result. Each processing flow invokes the use of at least one processing engine to perform an engine-specific task, such as geocoding, route finding, or image retrieval. A processing flow can also call on the machine-trained language model one or more additional times. In some cases, the technique includes a feedback mechanism for soliciting additional information from a user.

15 Claims, 20 Drawing Sheets

(51) Int. Cl.

| | |
|---|---|
| G06F 16/00 | (2019.01) |
| G06F 16/2453 | (2019.01) |
| G06F 16/2458 | (2019.01) |
| G06F 16/28 | (2019.01) |
| G06F 16/29 | (2019.01) |
| G06F 16/3329 | (2025.01) |
| G06F 40/237 | (2020.01) |
| G06F 40/284 | (2020.01) |
| G06F 40/295 | (2020.01) |
| G06F 40/30 | (2020.01) |
| G06F 40/35 | (2020.01) |
| G06F 40/40 | (2020.01) |
| G06N 3/00 | (2023.01) |
| G06N 3/042 | (2023.01) |
| G06N 3/045 | (2023.01) |
| G06N 20/00 | (2019.01) |

(52) U.S. Cl.

CPC ............ G06F 16/284 (2019.01); G06F 16/29 (2019.01); G06F 16/3329 (2019.01); G06F 40/237 (2020.01); G06F 40/284 (2020.01); G06F 40/295 (2020.01); G06F 40/30 (2020.01); G06F 40/35 (2020.01); G06F 40/40 (2020.01); G06N 3/042 (2023.01); G06N 3/045 (2023.01); G06N 20/00 (2019.01)

(58) Field of Classification Search

CPC .. G06F 16/3329; G06F 16/332; G06F 16/383; G06F 16/316; G06F 16/3334; G06F 16/219; G06F 40/284; G06F 40/40; G06F 40/30; G06F 40/295; G06F 40/35; G06F 40/237; G01C 21/3407; G01C 21/3629; G01C 21/3626; G01C 21/3644; G01C 21/3641; G01C 21/3889; G01C 21/3859; G01C 21/32; G01C 21/3819; G01C 21/3896; G06N 20/00; G06N 3/045; G06N 3/042; G06N 5/01

See application file for complete search history.

(56) References Cited

U.S. PATENT DOCUMENTS

| | | | | |
|---|---|---|---|---|
| 2016/0258767 | A1 | 9/2016 | Nevrekar et al. | |
| 2018/0157758 | A1* | 6/2018 | Arrizabalaga | G06N 3/08 |
| 2020/0160148 | A1* | 5/2020 | Garg | G01C 21/3492 |
| 2021/0133195 | A1* | 5/2021 | Jiang | G06N 20/00 |
| 2021/0182620 | A1* | 6/2021 | Tan | G06V 10/82 |
| 2021/0287141 | A1* | 9/2021 | Molloy | G06F 18/22 |
| 2021/0366144 | A1* | 11/2021 | Magistri | G06V 20/56 |
| 2021/0403036 | A1* | 12/2021 | Danna | G01C 21/3407 |
| 2023/0168101 | A1* | 6/2023 | Carbune | G01C 21/3629 701/424 |
| 2024/0126795 | A1* | 4/2024 | Zhong | H04L 51/02 |

OTHER PUBLICATIONS

Jiazhan Feng, et al., "Learning Multi-turn Response Selection in Grounded Dialogues with Reinforced Knowledge and Context Distillation", ACM Transactions on Information Systems, vol. 41, Issue 4 Article No. 115, Published: Apr. 21, 2023 pp. 1-27.*

"Find a Location by Query," available at https://learn.microsoft. com/en-us/bingmaps/rest-services/locations/find-a-location-by-query, Microsoft Corporation, Documentation, Jul. 20, 2022, 15 pages.

Brown, et al., "Language Models are Few-Shot Learners," in 34th Conference on Neural Information Processing Systems (NeurIPS 2020), 2020, 25 pages.

"Bing Maps Support," available at https://www.microsoft.com/en-us/maps/support, Bing Maps support website, Microsoft Corporation, accessed Mar. 11, 2023, 4 pages.

Devlin, et al., "BERT: Pre-training of Deep Bidirectional Transformers for Language Understanding," arXiv, arXiv:1810.04805v2 [cs.CL], May 24, 2019, 16 pages.

Vaswani, et al., "Attention Is All You Need," in 31st Conference on Neural Information Processing Systems (NIPS 2017), 2017, 11 pages.

"Text Search," available at https://developers.google.com/maps/documentation/places/web-service/search-text, Google Maps Platform, accessed on Mar. 11, 2023, 26 pages.

"Nominatim," available at https://wiki.openstreetmap.org/wiki/Nominatim, Wikipedia article, accessed on Mar. 12, 2023, 3 pages.

Berkhin, et al., "A New Approach to Geocoding: BingGC," in SIGSPATIAL '15: Proceedings of the 23rd SIGSPATIAL International Conference on Advances in Geographic Information Systems, Article No. 7, Nov. 2015, 10 pages.

Craig, et al., Scaling Address Parsing Sequence Models through Active Learning, in SIGSPATIAL '19: Proceedings of the 27th ACM Sigspatial International Conference on Advances in Geographic Information Systems, Nov. 2019, 4 pages.

Delling, et al., "Customizable Route Planning in Road Networks," available at https://www.microsoft.com/en-us/research/publication/customizable-route-planning-in-road-networks/, Jul. 24, 2013, 31 pages.

Delling, et al., "Customizable Route Planning in Road Networks," in Proceedings of the Sixth International Symposium on Combinatorial Search, Jul. 2013, 1 page.

Huang, et al., "Active Learning for Transformer Models in Direction Query Tagging," in SIGSPATIAL '22: Proceedings of the 30th International Conference on Advances in Geographic Information Systems, Article No. 70, Nov. 2022, 4 pages.

"Bing Maps REST Services," available at https://learn.microsoft.com/en-us/bingmaps/rest-services/, Microsoft Corporation, Redmond, WA, Jul. 20, 2022, 2 pages.

Ouyang, et al., "Training language models to follow instructions with human feedback," arXiv, arXiv:2203.02155v1 [cs.CL], Mar. 4, 2022, 68 pages.

Shen, et al., "HuggingGPT: Solving AI Tasks with ChatGPT and its Friends in Hugging Face," arXiv, arXiv:2303.17580v3 [cs.CL], May 25, 2023, 25 pages.

Wu, et al., "Visual ChatGPT: Talking, Drawing and Editing with Visual Foundation Models," arXiv, arXiv:2303.04671v1 [cs.CV], Mar. 8, 2023, 17 pages.

"Local Search," available at https://learn.microsoft.com/en-us/bingmaps/rest-services/locations/local-search, Microsoft Corporation, Redmond, WA, Jul. 20, 2022, 20 pages.

"Convex hull," available at https://en.wikipedia.org/wiki/Convex_hull, Wikipedia article, accessed on Jul. 25, 2023, 18 pages.

"Perform geocoding and reverse geocoding," available at https://learn.microsoft.com/en-us/windows/uwp/maps-and-location/geocoding, Microsoft Corporation, Redmond, WA, Oct. 20, 2022, 4 pages.

Radford, et al., "Improving Language Understanding by Generative Pre-Training," available at https://cdn.openai.com/research-covers/language-unsupervised/language_understanding_paper.pdf, OpenAI, San Francisco, California, Jun. 11, 2018, 12 pages.

Touvron, et al., "LLaMA: Open and Efficient Foundation Language Models," arXiv, Cornell University, arXiv:2302.13971v1 [cs.CL], Feb. 27, 2023, 27 pages.

"Graham scan," available at https://en.wikipedia.org/wiki/Graham_scan, Wikipedia article, accessed on Jul. 25, 2023, 4 pages.

"Address geocoding," available at https://en.wikipedia.org/wiki/Address_geocoding, Wikipedia article, accessed on Jul. 25, 2023, 9 pages.

Zhang, et al., "Map GPT Playground: Smart Locations and Routes with GPT," in SIGSPATIAL '23: Proceedings of the 31st ACM International Conference on Advances in Geographic Information Systems, Article No. 52, Nov. 2023, pp. 1-4.

(56)        References Cited

OTHER PUBLICATIONS

International Search Report and Written Opinion for PCT Application No. PCT/US2024/039969, mailing date Nov. 21, 2024, 12 pages.

* cited by examiner

Query 1

406

List all locations that the characters in "The
Grapes of Wrath" went through.  Show them on
a map.

404

User Latitude 37.411692

Submit

408

User Longitude

-122.071543

Textual Response

The Characters in "The Grapes of Wrath" by John Steinbeck mainly traveled from
Oklahoma to California, passing through various locations such as Texas, New
Mexico, and Arizona.  Some of the specific places mention in the book include
Sallisaw, OK, McAlester, OK, Pampa, TX, Tucumcari, NM, Needles, CA, and
Bakersfield, CA.  Here's a map that shows a possible travel route taken by the
characters in the novel.

410

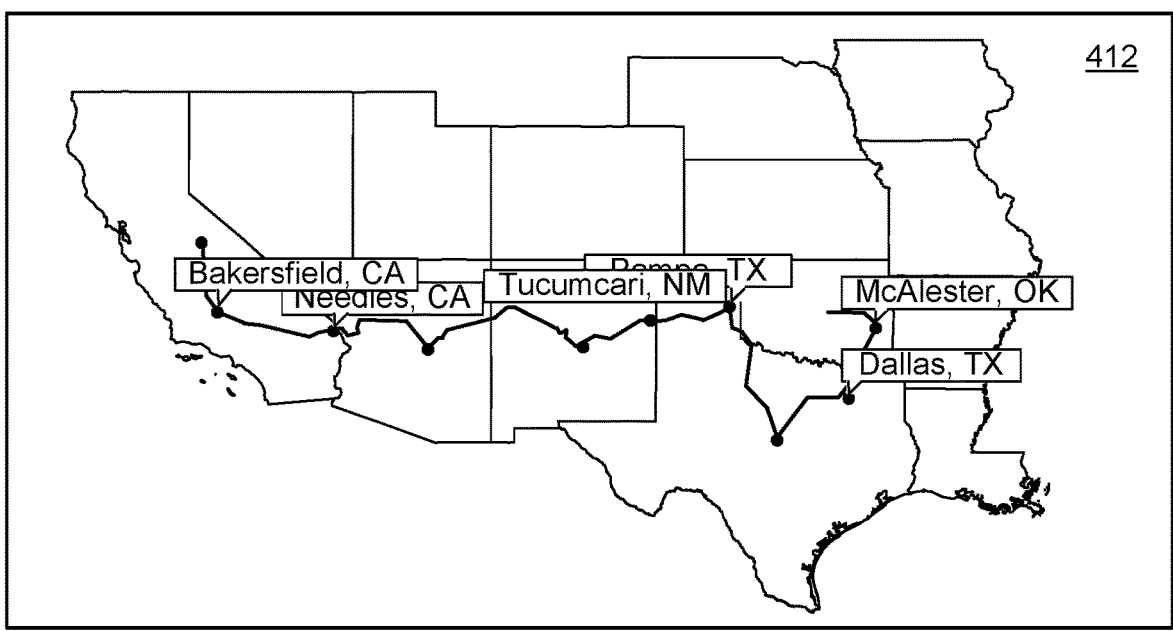

Query 2
Also show a map of dust storm impact in the
Great Depression.
504
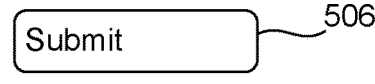
Submit    506
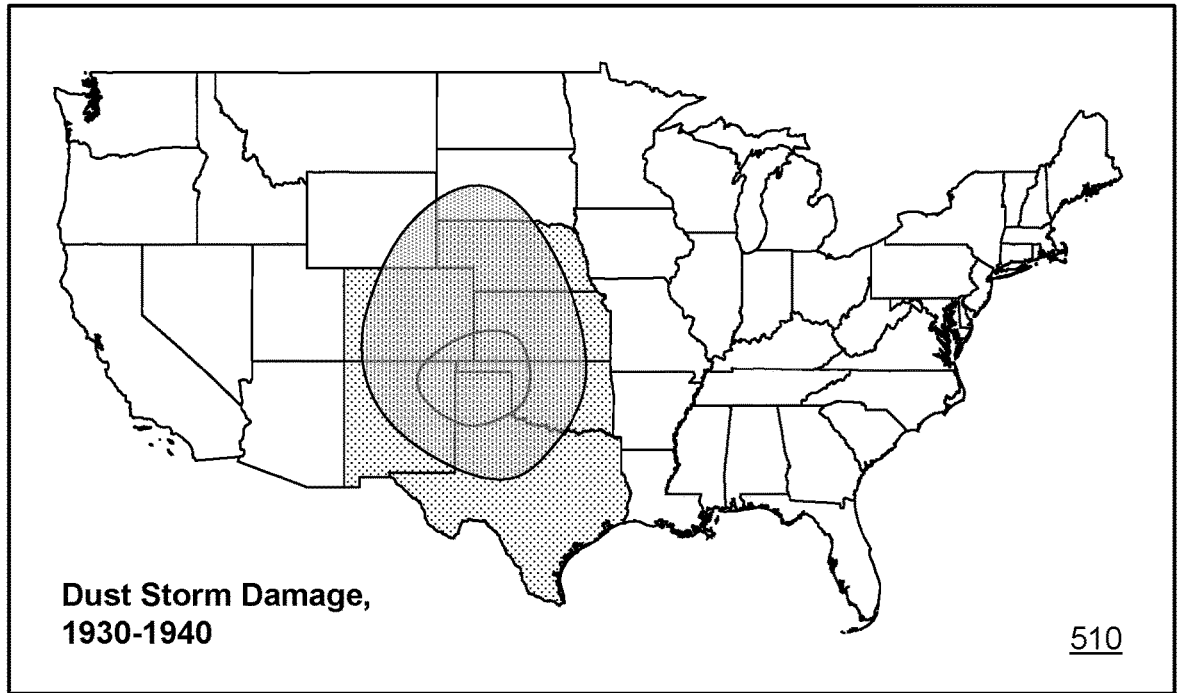
**Dust Storm Damage,
1930-1940**
510
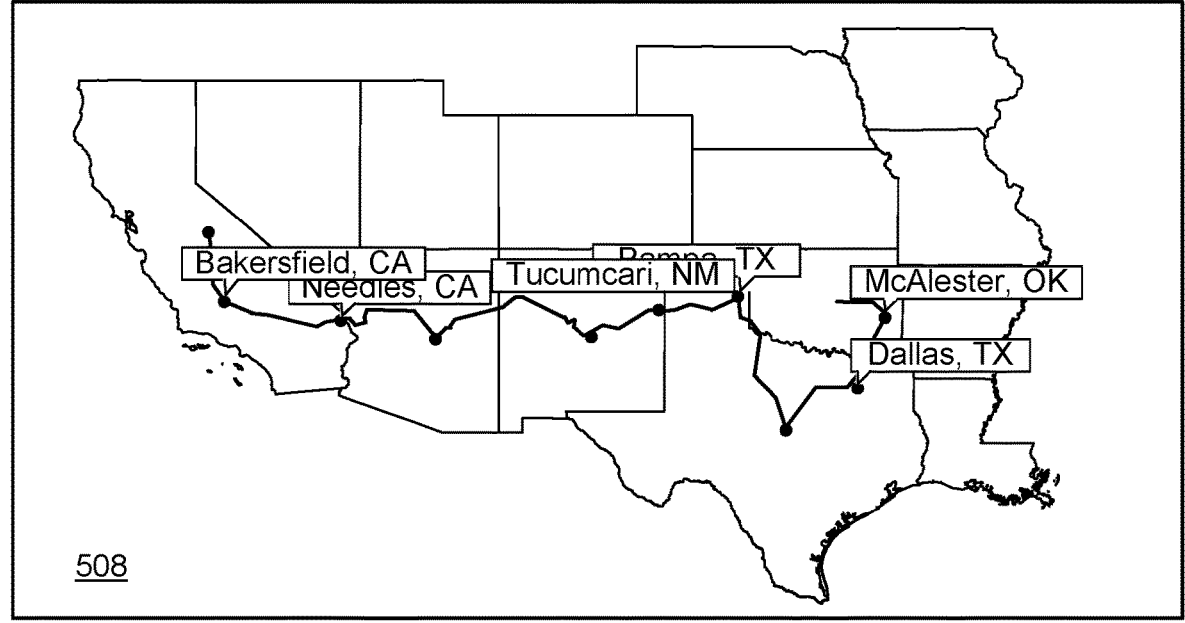
508
502 →
FIG. 5

Query

On my week off, I want to travel from San Francisco to Los Angeles, visiting Salinas and Bakersfield along the way.

604

Submit     606

602

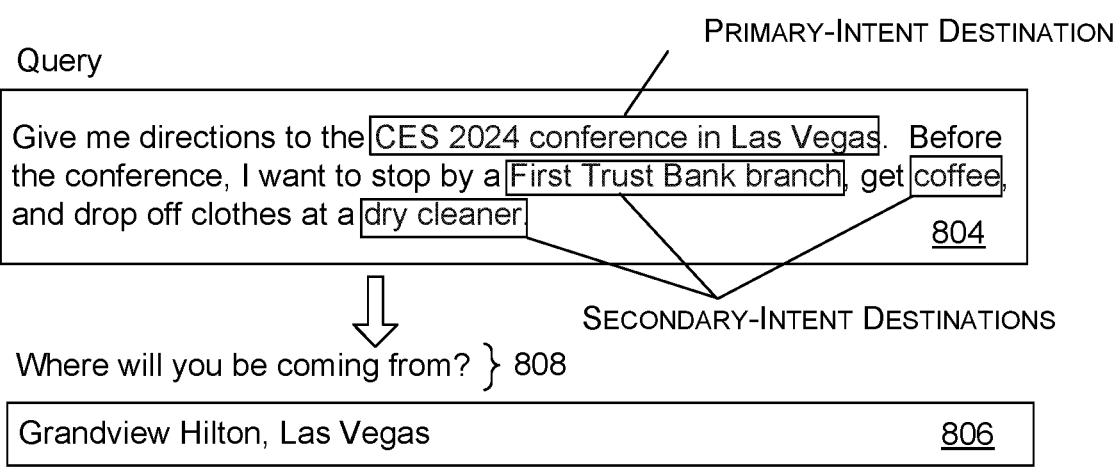
PRIMARY-INTENT DESTINATION
Query
Give me directions to the CES 2024 conference in Las Vegas. Before the conference, I want to stop by a First Trust Bank branch, get coffee, and drop off clothes at a dry cleaner.        804
SECONDARY-INTENT DESTINATIONS
Where will you be coming from? } 808
Grandview Hilton, Las Vegas        806
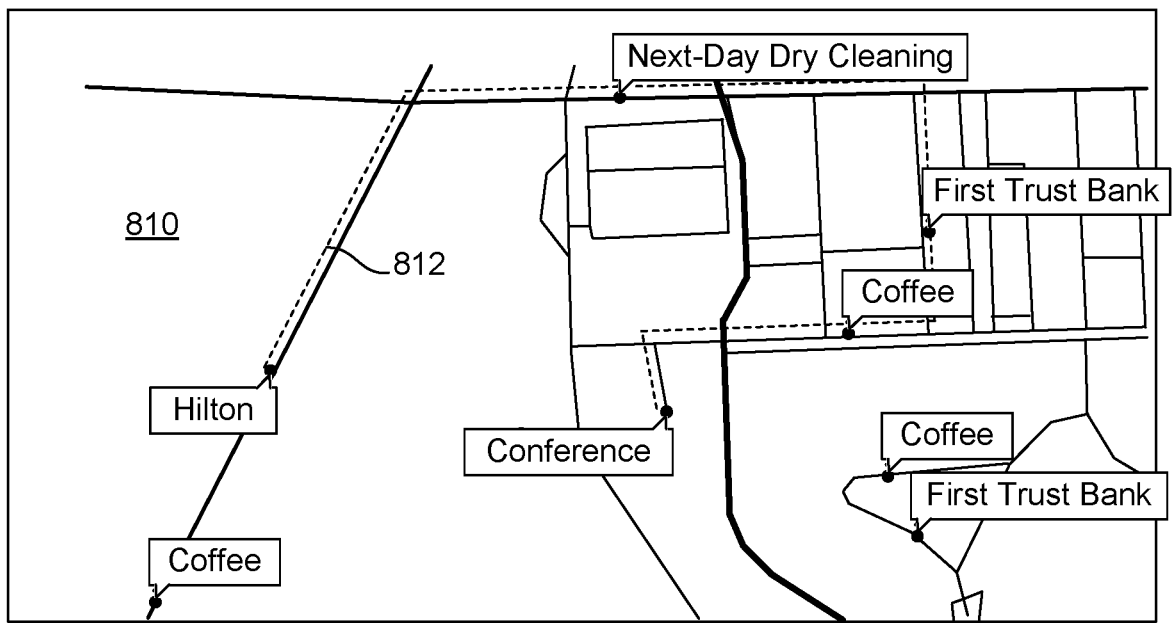
FIG. 8
802
Relationship A        Relationship B        Relationship C        Relationship D
FIG. 9

Figure 10:
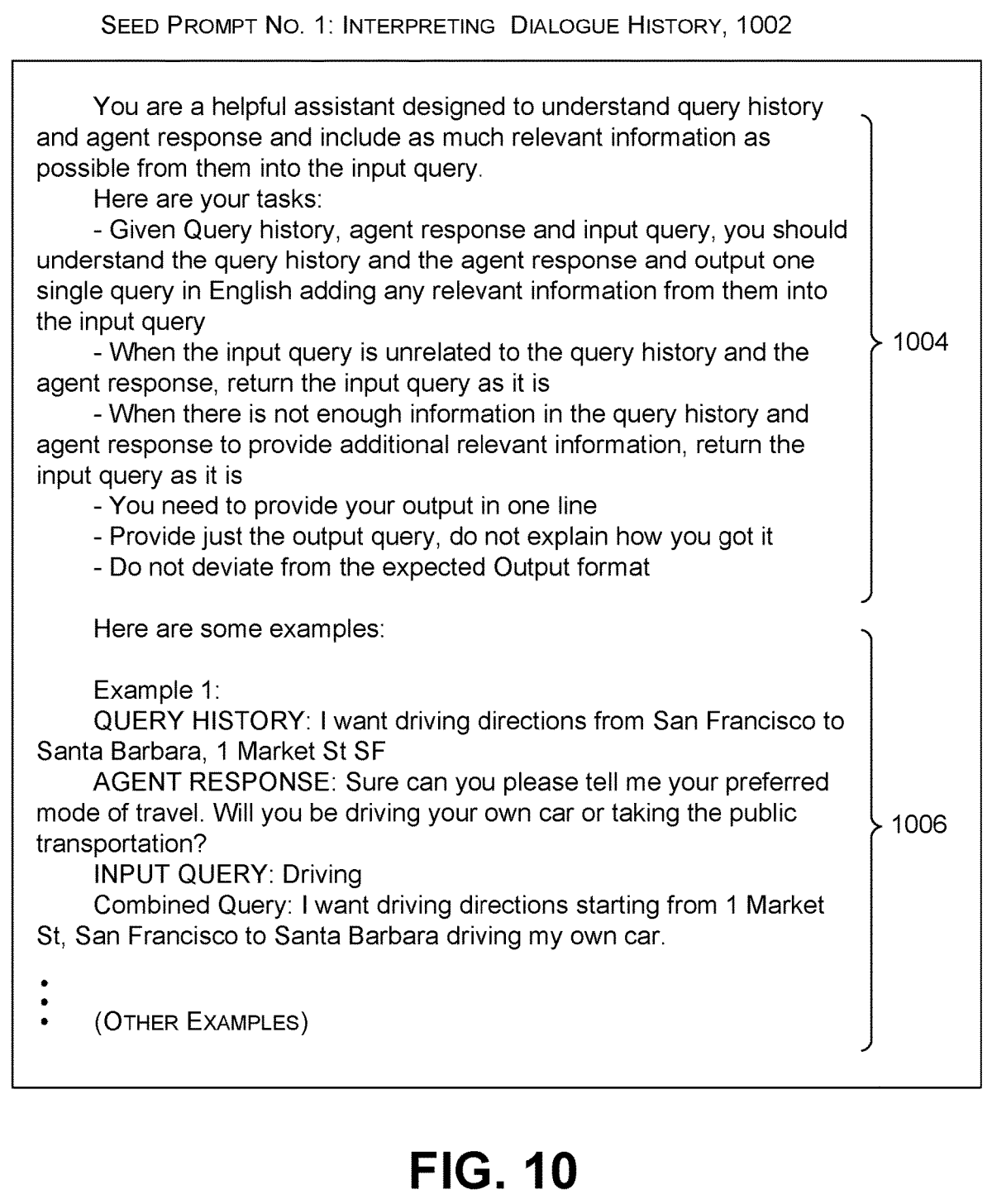

SEED PROMPT NO. 1: INTERPRETING DIALOGUE HISTORY, 1002

You are a helpful assistant designed to understand query history and agent response and include as much relevant information as possible from them into the input query.

Here are your tasks:

- Given Query history, agent response and input query, you should understand the query history and the agent response and output one single query in English adding any relevant information from them into the input query

- When the input query is unrelated to the query history and the agent response, return the input query as it is

- When there is not enough information in the query history and agent response to provide additional relevant information, return the input query as it is

- You need to provide your output in one line

- Provide just the output query, do not explain how you got it

- Do not deviate from the expected Output format

} 1004

Here are some examples:

Example 1:
QUERY HISTORY: I want driving directions from San Francisco to Santa Barbara, 1 Market St SF AGENT RESPONSE: Sure can you please tell me your preferred mode of travel. Will you be driving your own car or taking the public transportation?

INPUT QUERY: Driving

Combined Query: I want driving directions starting from 1 Market St, San Francisco to Santa Barbara driving my own car.

.
.
.

(OTHER EXAMPLES)

SEED PROMPT NO. 2: DETECTING INTENT, 1102

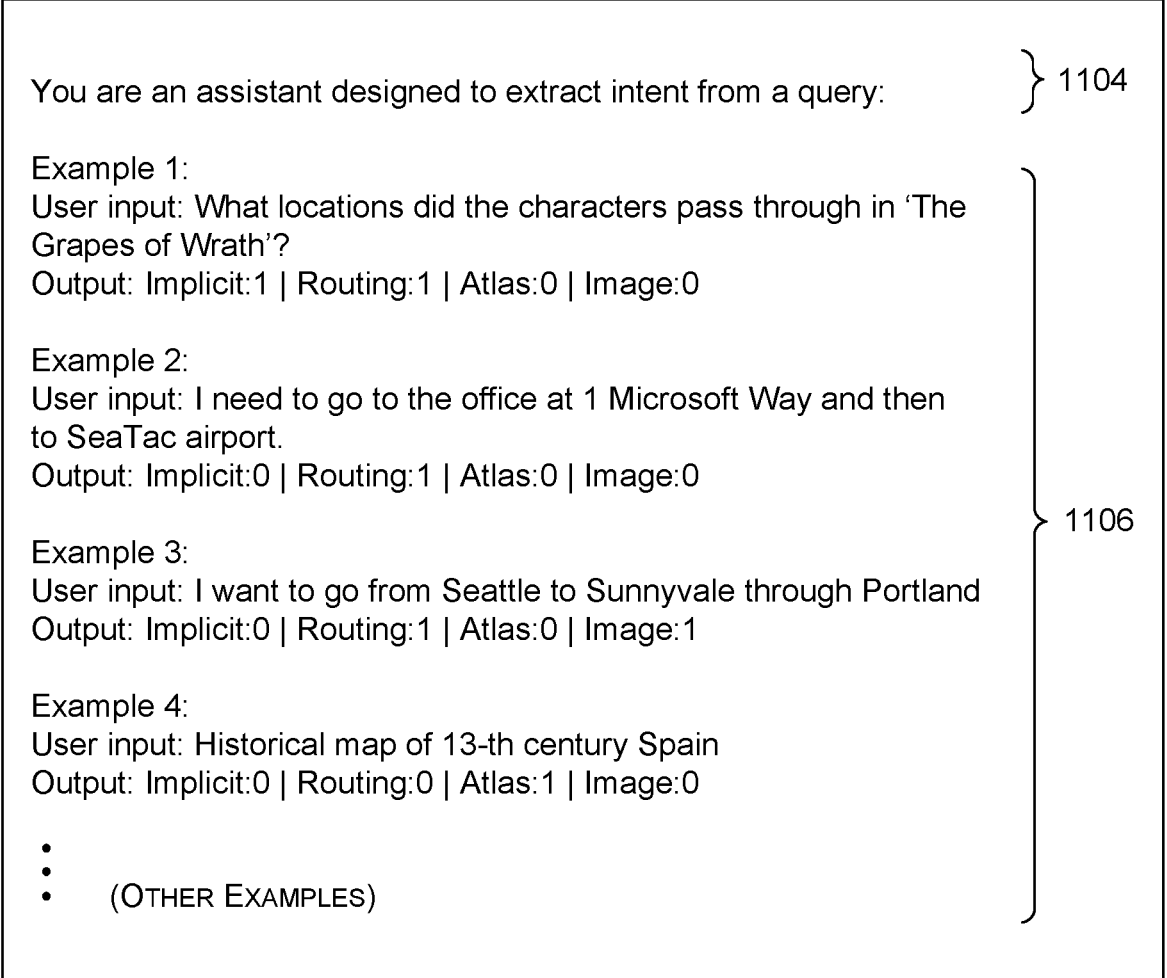

You are an assistant designed to extract intent from a query:    } 1104

Example 1:
User input: What locations did the characters pass through in 'The Grapes of Wrath'?
Output: Implicit:1 | Routing:1 | Atlas:0 | Image:0

Example 2:
User input: I need to go to the office at 1 Microsoft Way and then to SeaTac airport.
Output: Implicit:0 | Routing:1 | Atlas:0 | Image:0

Example 3:
User input: I want to go from Seattle to Sunnyvale through Portland
Output: Implicit:0 | Routing:1 | Atlas:0 | Image:1

Example 4:
User input: Historical map of 13-th century Spain
Output: Implicit:0 | Routing:0 | Atlas:1 | Image:0

⋮

•    (OTHER EXAMPLES)

SEED PROMPT NO 3: DETECTING ENTITIES AND THEIR RELATIONSHIPS, 1202

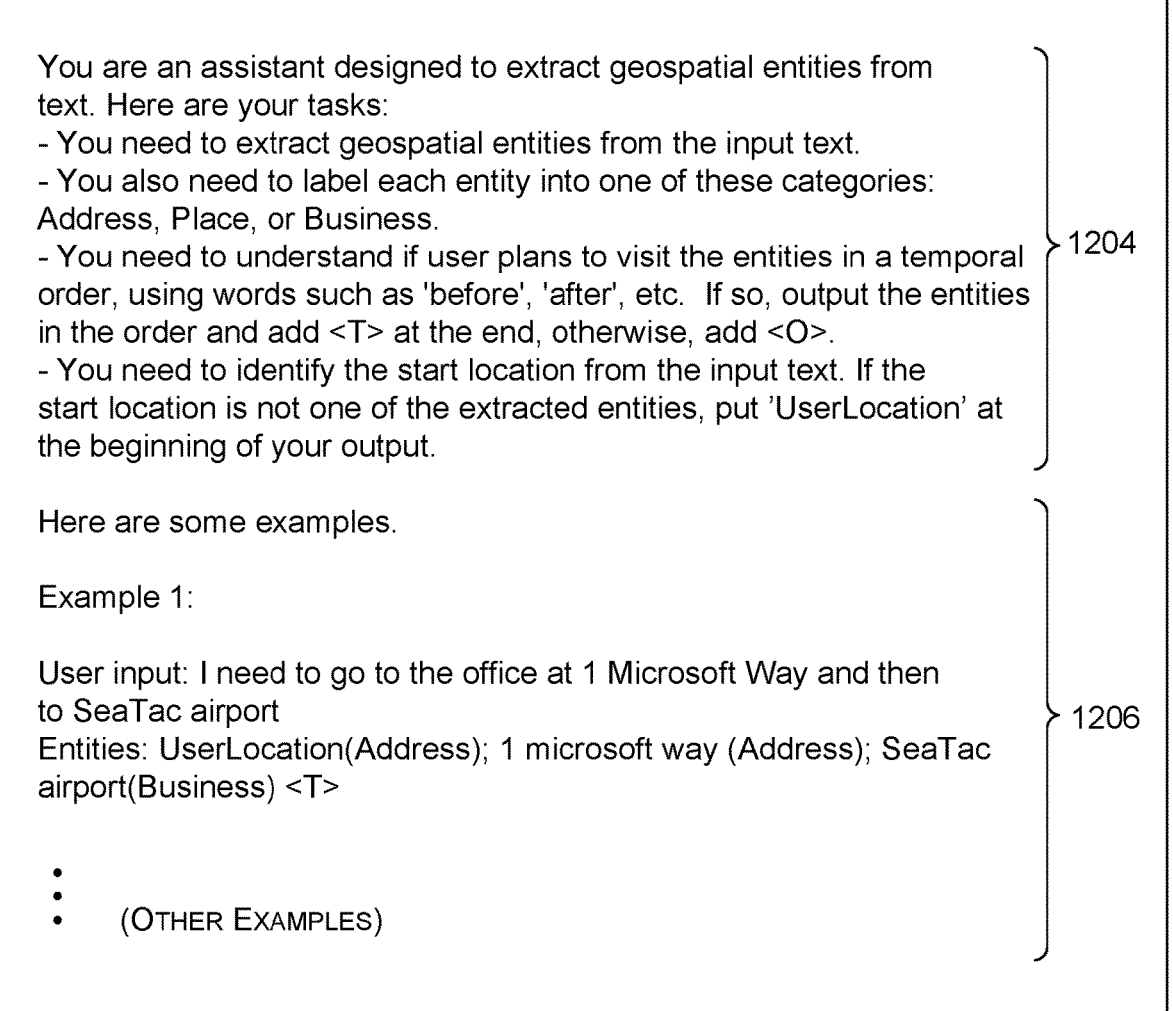

You are an assistant designed to extract geospatial entities from text. Here are your tasks:
- You need to extract geospatial entities from the input text.
- You also need to label each entity into one of these categories: Address, Place, or Business.
- You need to understand if user plans to visit the entities in a temporal order, using words such as 'before', 'after', etc.  If so, output the entities in the order and add <T> at the end, otherwise, add <O>.
- You need to identify the start location from the input text. If the start location is not one of the extracted entities, put 'UserLocation' at the beginning of your output.

} 1204

Here are some examples.

Example 1:

User input: I need to go to the office at 1 Microsoft Way and then to SeaTac airport
Entities: UserLocation(Address); 1 microsoft way (Address); SeaTac airport(Business) <T>

⋮
•    (OTHER EXAMPLES)

SEED PROMPT No. 4: CLASSIFYING THE IMPORTANCE OF ENTITIES, 1302

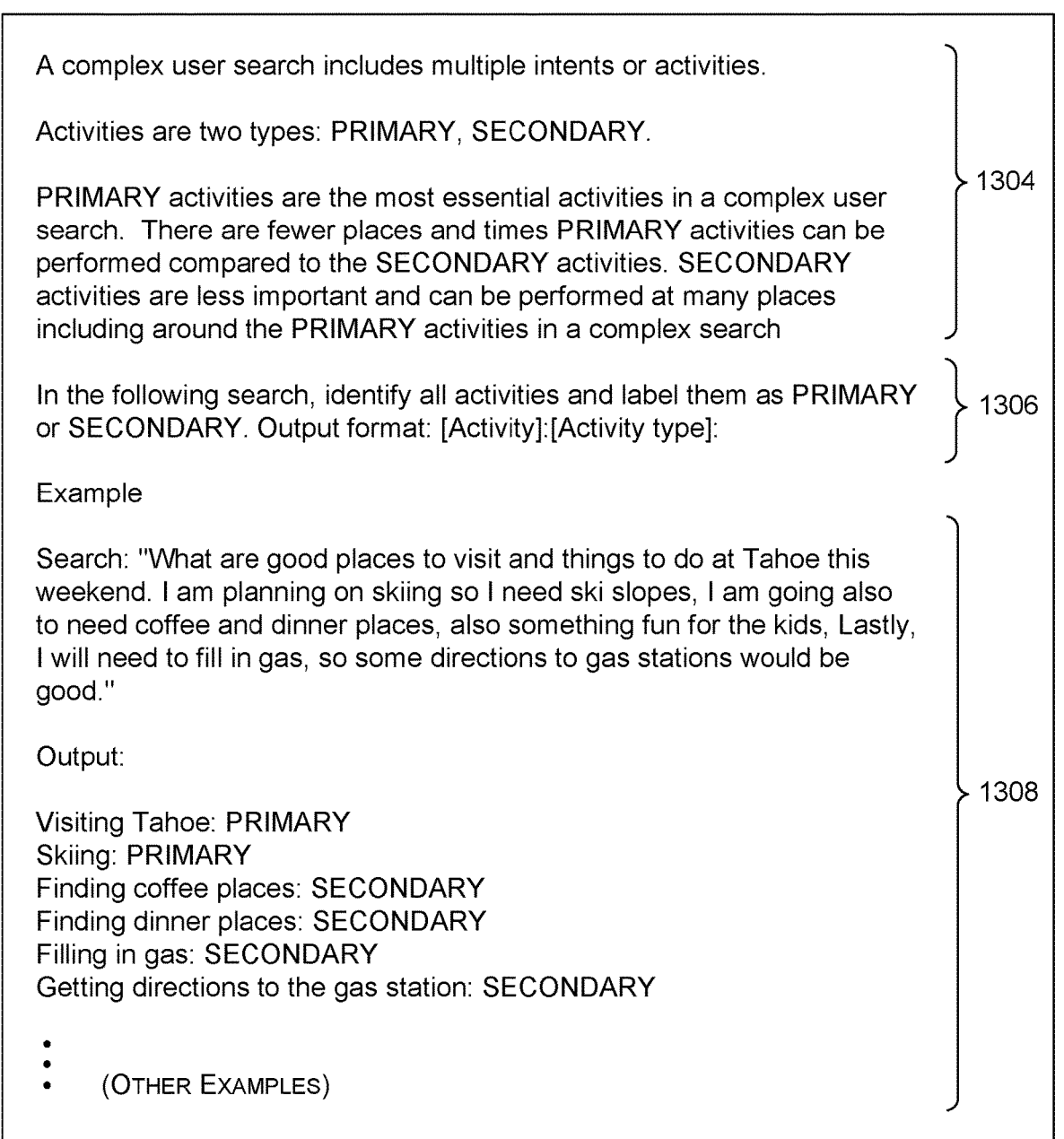

A complex user search includes multiple intents or activities.

Activities are two types: PRIMARY, SECONDARY.

PRIMARY activities are the most essential activities in a complex user search. There are fewer places and times PRIMARY activities can be performed compared to the SECONDARY activities. SECONDARY activities are less important and can be performed at many places including around the PRIMARY activities in a complex search

}1304

In the following search, identify all activities and label them as PRIMARY or SECONDARY. Output format: [Activity]:[Activity type]:

}1306

Example

Search: "What are good places to visit and things to do at Tahoe this weekend. I am planning on skiing so I need ski slopes, I am going also to need coffee and dinner places, also something fun for the kids, Lastly, I will need to fill in gas, so some directions to gas stations would be good."

Output:

Visiting Tahoe: PRIMARY
Skiing: PRIMARY
Finding coffee places: SECONDARY
Finding dinner places: SECONDARY
Filling in gas: SECONDARY
Getting directions to the gas station: SECONDARY

.
.
.
    (OTHER EXAMPLES)

DETECTED ENTITIES

GEOCODING ENGINE
1402

TILE-MATCHING
COMPONENT
1410

1408

T1
TILE
INFO.
1406

LOCATION, TYPE, ETC.
OF ENTITIES

T1

1404

Noodles Place

First Trust Bank

Jim's Bowling Alley

Coffee

ROUTING ENGINE
1502

ENTITIES,
LOCATIONS,
PRIORITIES, ETC.

CANDIDATE-FINDING
COMPONENT
1504

1508

CANDIDATES

ROADWAY
INFOR-
MATION

PROPOSED
ROUTE(S)

CANDIDATE-SELECTING
COMPONENT
1506

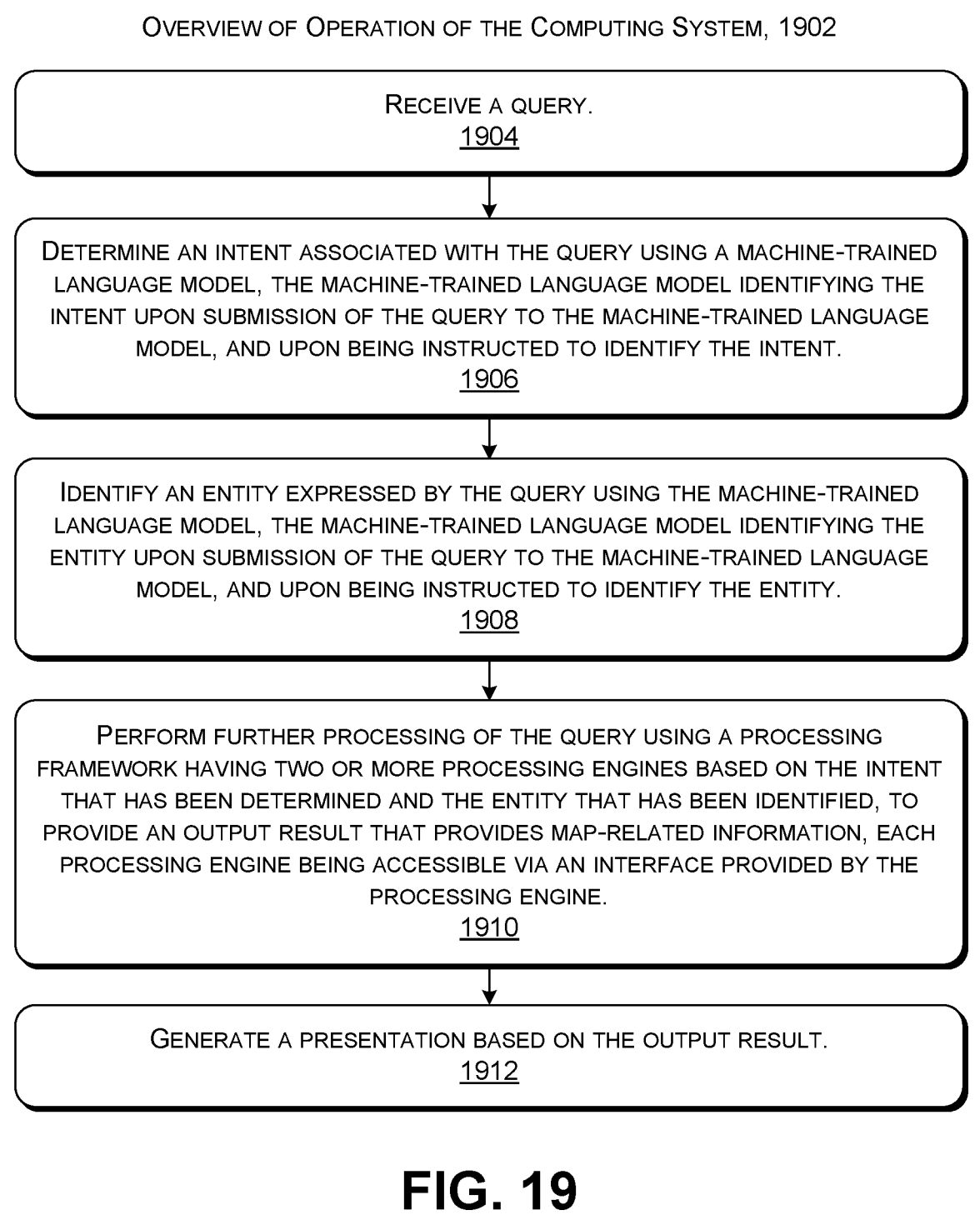

OVERVIEW OF OPERATION OF THE COMPUTING SYSTEM, 1902

RECEIVE A QUERY.
1904

DETERMINE AN INTENT ASSOCIATED WITH THE QUERY USING A MACHINE-TRAINED LANGUAGE MODEL, THE MACHINE-TRAINED LANGUAGE MODEL IDENTIFYING THE INTENT UPON SUBMISSION OF THE QUERY TO THE MACHINE-TRAINED LANGUAGE MODEL, AND UPON BEING INSTRUCTED TO IDENTIFY THE INTENT.
1906

IDENTIFY AN ENTITY EXPRESSED BY THE QUERY USING THE MACHINE-TRAINED LANGUAGE MODEL, THE MACHINE-TRAINED LANGUAGE MODEL IDENTIFYING THE ENTITY UPON SUBMISSION OF THE QUERY TO THE MACHINE-TRAINED LANGUAGE MODEL, AND UPON BEING INSTRUCTED TO IDENTIFY THE ENTITY.
1908

PERFORM FURTHER PROCESSING OF THE QUERY USING A PROCESSING FRAMEWORK HAVING TWO OR MORE PROCESSING ENGINES BASED ON THE INTENT THAT HAS BEEN DETERMINED AND THE ENTITY THAT HAS BEEN IDENTIFIED, TO PROVIDE AN OUTPUT RESULT THAT PROVIDES MAP-RELATED INFORMATION, EACH PROCESSING ENGINE BEING ACCESSIBLE VIA AN INTERFACE PROVIDED BY THE PROCESSING ENGINE.
1910

GENERATE A PRESENTATION BASED ON THE OUTPUT RESULT.
1912

FIG. 19

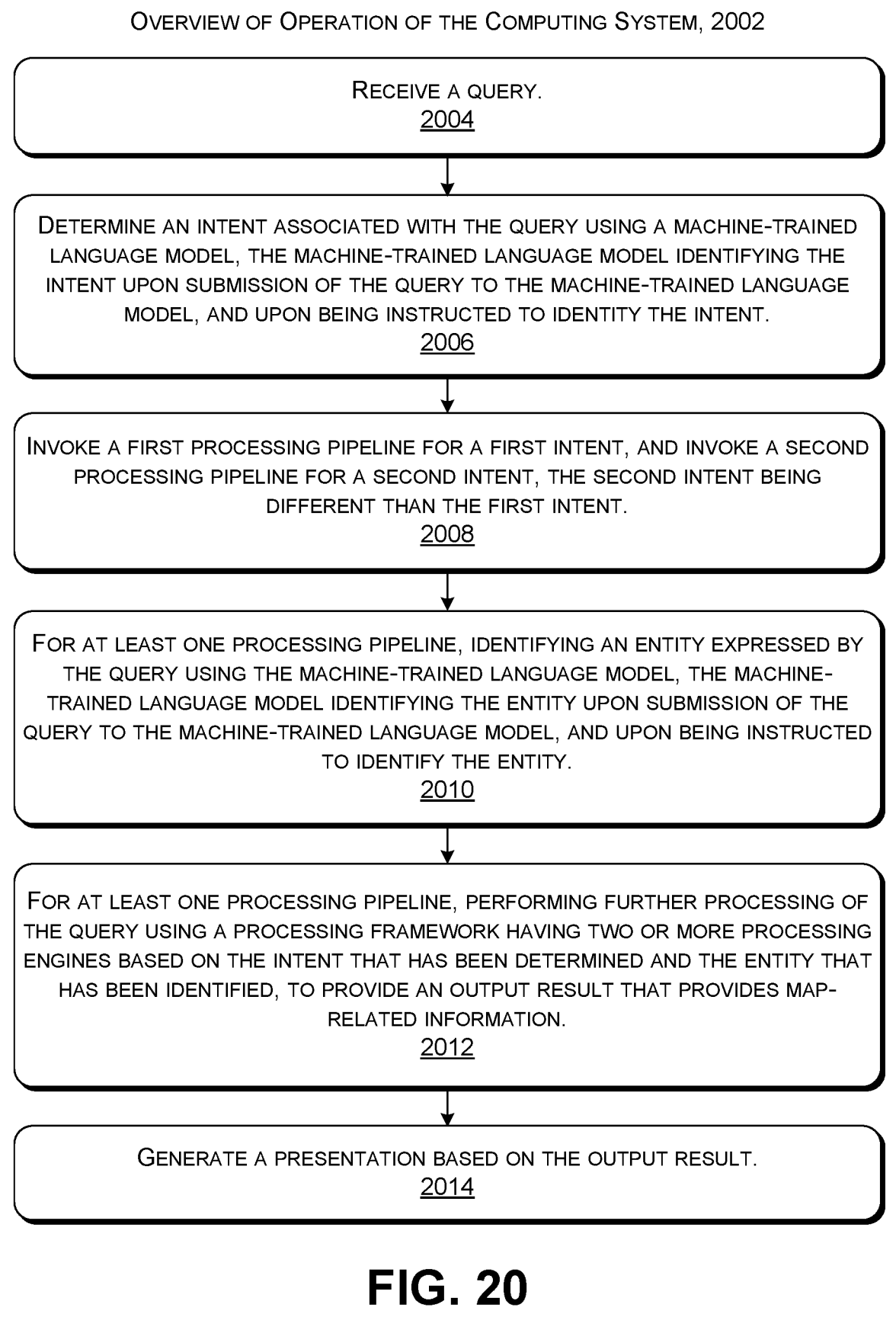

Overview of Operation of the Computing System, 2002

RECEIVE A QUERY.
2004

DETERMINE AN INTENT ASSOCIATED WITH THE QUERY USING A MACHINE-TRAINED LANGUAGE MODEL, THE MACHINE-TRAINED LANGUAGE MODEL IDENTIFYING THE INTENT UPON SUBMISSION OF THE QUERY TO THE MACHINE-TRAINED LANGUAGE MODEL, AND UPON BEING INSTRUCTED TO IDENTITY THE INTENT.
2006

INVOKE A FIRST PROCESSING PIPELINE FOR A FIRST INTENT, AND INVOKE A SECOND PROCESSING PIPELINE FOR A SECOND INTENT, THE SECOND INTENT BEING DIFFERENT THAN THE FIRST INTENT.
2008

FOR AT LEAST ONE PROCESSING PIPELINE, IDENTIFYING AN ENTITY EXPRESSED BY THE QUERY USING THE MACHINE-TRAINED LANGUAGE MODEL, THE MACHINE-TRAINED LANGUAGE MODEL IDENTIFYING THE ENTITY UPON SUBMISSION OF THE QUERY TO THE MACHINE-TRAINED LANGUAGE MODEL, AND UPON BEING INSTRUCTED TO IDENTIFY THE ENTITY.
2010

FOR AT LEAST ONE PROCESSING PIPELINE, PERFORMING FURTHER PROCESSING OF THE QUERY USING A PROCESSING FRAMEWORK HAVING TWO OR MORE PROCESSING ENGINES BASED ON THE INTENT THAT HAS BEEN DETERMINED AND THE ENTITY THAT HAS BEEN IDENTIFIED, TO PROVIDE AN OUTPUT RESULT THAT PROVIDES MAP-RELATED INFORMATION.
2012

GENERATE A PRESENTATION BASED ON THE OUTPUT RESULT.
2014

FIG. 20

Figure 21:
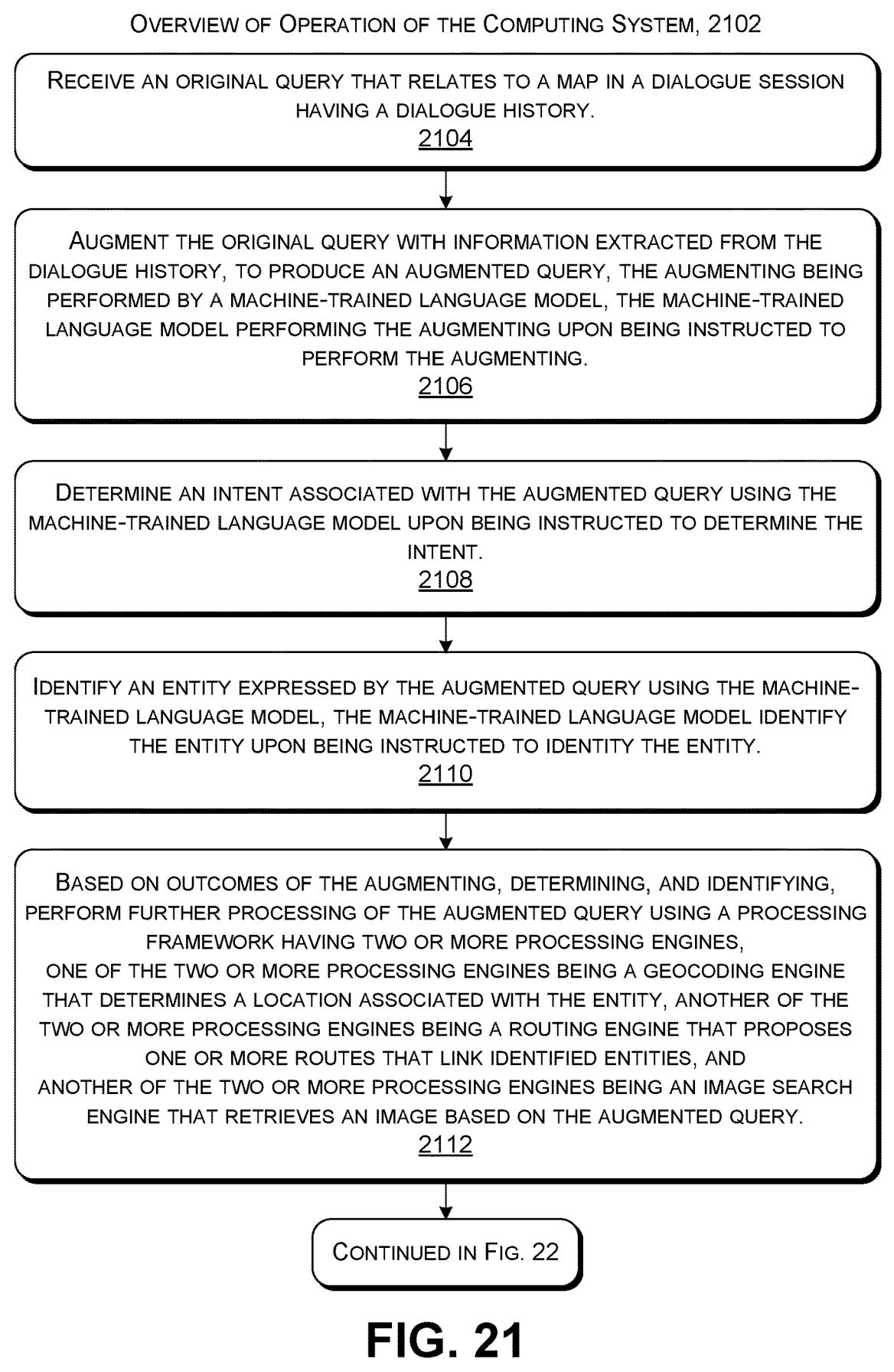

OVERVIEW OF OPERATION OF THE COMPUTING SYSTEM, 2102

RECEIVE AN ORIGINAL QUERY THAT RELATES TO A MAP IN A DIALOGUE SESSION HAVING A DIALOGUE HISTORY.
2104

AUGMENT THE ORIGINAL QUERY WITH INFORMATION EXTRACTED FROM THE DIALOGUE HISTORY, TO PRODUCE AN AUGMENTED QUERY, THE AUGMENTING BEING PERFORMED BY A MACHINE-TRAINED LANGUAGE MODEL, THE MACHINE-TRAINED LANGUAGE MODEL PERFORMING THE AUGMENTING UPON BEING INSTRUCTED TO PERFORM THE AUGMENTING.
2106

DETERMINE AN INTENT ASSOCIATED WITH THE AUGMENTED QUERY USING THE MACHINE-TRAINED LANGUAGE MODEL UPON BEING INSTRUCTED TO DETERMINE THE INTENT.
2108

IDENTIFY AN ENTITY EXPRESSED BY THE AUGMENTED QUERY USING THE MACHINE-TRAINED LANGUAGE MODEL, THE MACHINE-TRAINED LANGUAGE MODEL IDENTIFY THE ENTITY UPON BEING INSTRUCTED TO IDENTITY THE ENTITY.
2110

BASED ON OUTCOMES OF THE AUGMENTING, DETERMINING, AND IDENTIFYING, PERFORM FURTHER PROCESSING OF THE AUGMENTED QUERY USING A PROCESSING FRAMEWORK HAVING TWO OR MORE PROCESSING ENGINES,
ONE OF THE TWO OR MORE PROCESSING ENGINES BEING A GEOCODING ENGINE THAT DETERMINES A LOCATION ASSOCIATED WITH THE ENTITY, ANOTHER OF THE TWO OR MORE PROCESSING ENGINES BEING A ROUTING ENGINE THAT PROPOSES ONE OR MORE ROUTES THAT LINK IDENTIFIED ENTITIES, AND
ANOTHER OF THE TWO OR MORE PROCESSING ENGINES BEING AN IMAGE SEARCH ENGINE THAT RETRIEVES AN IMAGE BASED ON THE AUGMENTED QUERY.
2112

CONTINUED FROM FIG. 21

ASCERTAIN WHETHER ADDITIONAL INFORMATION IS NEEDED TO PROVIDE AN ANSWER TO THE ORIGINAL QUERY.
2202

No

Yes

COLLECT THE ADDITIONAL INFORMATION FOR A CASE IN WHICH THE ADDITIONAL INFORMATION IS DETERMINED TO BE NEEDED.
2204

RECEIVE THE ADDITIONAL INFORMATION, AND RETURN TO BLOCK 2106
2206

TO BLOCK 2106 OF FIG. 21

GENERATE A PRESENTATION BASED ON THE OUTPUT RESULT, THE OUTPUT RESULT PROVIDING MAP-RELATED INFORMATION.
2208

FIG. 22

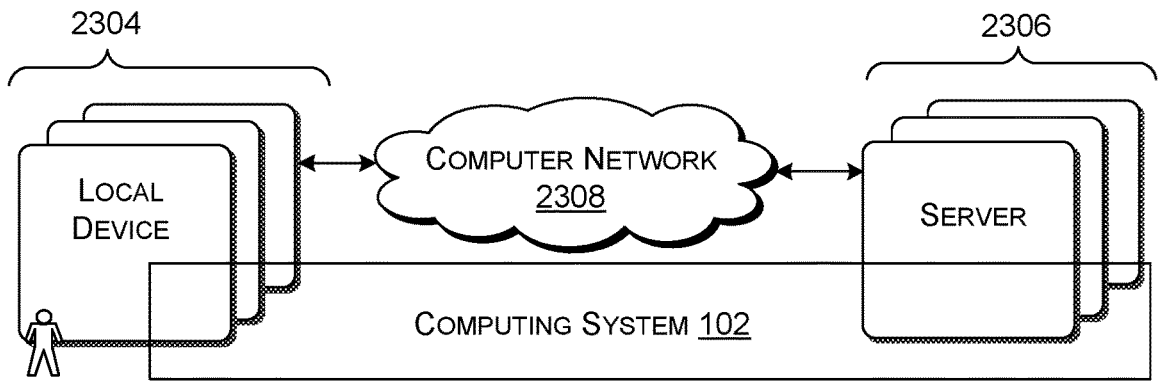

2304

2306

LOCAL DEVICE

COMPUTER NETWORK
2308

SERVER

COMPUTING SYSTEM 102

INTERPRETING AND RESOLVING MAP-RELATED QUERIES USING A LANGUAGE MODEL

BACKGROUND

Route-finding engines and other map-inquiry engines are now in widespread use. But these engines can still only solve a relatively small subset of map-related inquiries. For example, many engines require the user to specify the characteristics of a desired route using a specific input format. This approach does not accommodate the many types of map-related inquiries that, although coherent and well-formed to a human interpreter, do not conform to the engine's narrow input expectations. Further, a user who wishes to interact with different route-finding engines must learn the respective input formats, capabilities, and limitations of these route-finding engines.

A developer may attempt to address this problem by increasing the complexity of a program used by a map-inquiry engine. For example, the developer can add new custom subroutines that address new inquiry scenarios. But such a solution is ad hoc in nature, and is therefore not readily adaptable to other inquiry scenarios. Further, such a solution runs the risks of increasing the engine's consumption of resources, and potentially worsens its latency-related performance. Further, such a solution imposes significant development and maintenance-related costs.

SUMMARY

A technique is described herein for processing a map-related query that integrates the use of a machine-trained language model (henceforth, "language model"). For example, upon submission of a query, the technique uses the language model to assess at least one intent associated with the query. After the intent is determined, the technique invokes an intent-specific processing flow to provide an output result that provides map-related information. Each processing flow invokes the use of at least one processing engine to perform an engine-specific task, including any of geocoding, route finding, image retrieval, local search (for performing a location-based search for entities-of-interest), user location determination, entity recommendation (e.g., for recommending places to visit), etc. A processing flow may also call on the language model again one or more times.

According to some examples, the language model is a generative language model. Further, in some examples, the language model is a large language model (LLM). Some manifestations of a generative LLM includes more than one hundred billion parameters.

According to another illustrative aspect, the query is submitted in a dialogue session having a dialogue history. The technique uses the language model to augment the last-submitted query with information extracted from the dialogue history.

According to another illustrative aspect, a query that is received expresses an entity by indirectly referring to the entity. For example, the query refers to an entity by describing a type of place associated with the query, there being two more instantiations of the type of place having two or more respective locations. Alternatively, or in addition, the query explicitly identifies a single entity having only one location.

According to another illustrative aspect, the query expresses two or more entities. The technique classifies each of the entities as either primary or secondary. A primary entity has a higher priority than a secondary entity, indicating that the primary entry is more central to a user's presumed interests compared to any secondary entity. In many cases, a primary entity has only one instantiation, whereas the secondary entity is associated with a class of entities having plural instantiations.

According to another illustrative aspect, in some circumstances, the technique generates an output message using the machine-trained language model. The output message conveys a request to supply a follow-on query that provides additional information, beyond the information that has already been imparted by an original query.

According to another illustrative aspect, the intent that is detected is an implicit intent. For this case, the technique generates a response to the query using the machine-trained language model. The technique then uses the machine-trained language model to detect entities identified by the query based on the query itself and the generated response. The technique then uses a geocoding engine to determine a location associated with each entity expressed by the query (and/response).

According to another illustrative aspect, the intent that is detected is a route-finding intent. For this case, the technique uses the machine-trained language model to detect entities identified by the query, and then uses a geocoding engine to determine a location associated with each entity expressed by the query. The technique then uses a routing engine to determine one or more proposed routes that connect the identified entities. In some cases, the language model also specifies an order in which the entities are to be connected together in a route, or specifies that an order is not conveyed or suggested by the query.

According to another illustrative aspect, the intent that is detected is a travel intent. For this case, the technique retrieves a travel-related image from a data store that pertains to the query, and presents the travel-related image in conjunction with an interactive map. According to another illustrative aspect, the intent that is detected is an atlas intent. For this case, the technique retrieves an atlas image from a data store that pertains the query, and presents the atlas image in conjunction with an interactive map. A travel-related image conveys information that assists a user in traveling over the roadways in a specific region, while an atlas image shows other characteristics of the region.

According to another illustrative aspect, the technique validates the accuracy of each proposed route using one or more consistency checks.

The technique is advantageous because it successfully interprets complex map-related queries, without demanding that a user express the query in a predetermined manner. For instance, the technique successfully processes queries that specify any number of entities, and/or queries that describe the relationships among the entities in any manner, e.g., using words such as "through," "between," "before," and "after." The technique is also readily extensible because it can be applied to many different environments without significant (or any) revision to its basic processing framework.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows an output presentation generated by the computing system of FIG. 1 for the case in which the query expresses an implicit intent.

FIG. 5 shows an output presentation generated by the computing system of FIG. 1 for the case in which the input query expresses an atlas intent. Further, FIG. 5 depicts a case in which the input query is interpreted in the context of the previous input query of FIG. 4.

FIG. 8 shows another output presentation generated by the computing system of FIG. 1 for the case in which the query expresses a route-finding intent. The computing system processes the query by discriminating between primary entities and secondary entities expressed in the query.

FIG. 9 shows four different relationships associated with a first query-response pair and a second query-response pair.

FIG. 10 shows a seed prompt that enables the language model (of FIG. 1) to integrate dialog history information into a current query.

FIG. 11 shows a seed prompt that enables the language model to detect the intent(s) expressed by a query.

FIG. 12 shows a seed prompt that enables the language model to identify entities expressed by the query, and various metadata pertaining to the entities.

FIG. 13 shows a seed prompt that enables the language model to discriminate between primary and secondary entities expressed by the query.

FIGS. 19-22 show three processes, expressed as flow-charts, which explain the operation of the computing system of FIG. 1 in three respective ways.

FIG. 23 shows computing equipment that, in some implementations, is used to implement the computing system of FIG. 1.

The same numbers are used throughout the disclosure and figures to reference like components and features.

DETAILED DESCRIPTION

Section A. Illustrative Computing System

Figure 1:
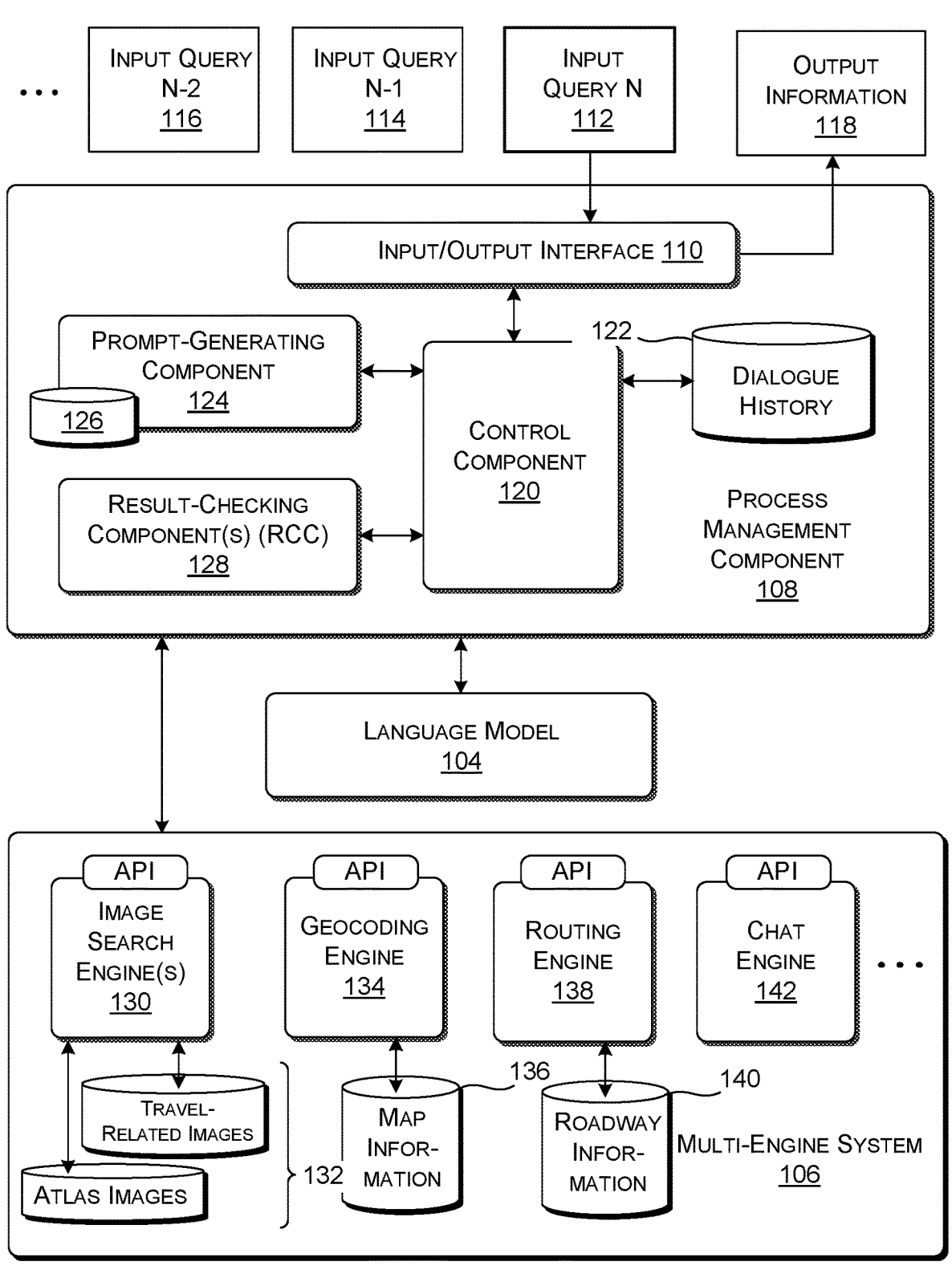
FIG. 1 shows a computing system for processing map-related queries using a language model and a collection of processing engines.

FIG. 1 shows a computing system 102 for processing a map-related query, which involves interpreting the query and then resolving the query by performing an action requested by the query or answering a question posed by the query. A map-related query is a query that asks a question that is answerable by interrogating map-related information. The map-related information, in turn, describes any information that can be represented by a map of any type, such as the transportation infrastructure of a particular region (such as its network of roads), the establishments and natural features located in the particular region, and so on. Any feature of a map is referred to herein as an entity. For example, a place of business or a specific address constitutes an entity.

The computing system 102 includes three main components. A machine-trained language model 104 (henceforth "language model") interprets each input query. A multi-engine system 106 includes or more processing engines for performing different respective map-related functions, including any of geocoding, route finding, image retrieval, local search (e.g., for performing a location-based search for businesses), user location determination, entity recommendation (e.g., for recommending a place to visit), etc. A process management component ("management component") 108 orchestrates plural context-specific processing flows.

From a high-level perspective, the management component 108 invokes the language model 104 to determine the intent (or intents) associated with an input query. The management component 108 then invokes an intent-specific processing flow based on the intent(s) that have been detected. Each intent-specific processing flow makes use of one or more processing engines in the multi-engine system 106. Any processing flow may also call on the language model 104 again, one or more times. For instance, at least one processing flow involves asking the language model 104 to identify all entities expressed by a query, either implicitly or explicitly.

The computing system 102 is technically advantageous because it is capable of processing a wide variety of complex free-form queries. In other words, there is no expectation that the queries conform to any engine-specific input format. For instance, the computing system 102 enables an input query to specify any number of entities, without limit. Further, the computing system 102 allows a query to identify an entity in an indirect manner. For instance, the computing system 102 allows a query to describe an entity by identifying a characteristic of the entity (such as a type of business associated with the entity), there being potentially two or more candidate entities that have this characteristic. Further, the computing system 102 allows a query to describe relationships among entities using a variety of terms, including "beforehand," "after," "between," "first," "second," etc. All of these capabilities enable the computing system 102 to serve as a flexible tool that is readily adaptable to different environments, applications, and search objectives.

Further, the computing system 102 integrates the use of different processing engines in a flexible context-driven manner, without requiring a developer to write complex scenario-specific subroutines. This characteristic further improves the flexibility and extensibility of the computing system 102.

Viewed from another perspective, the computing system 102 mediates interaction with at least one processing engine. In particular, the computing system 102 transforms a complex query that cannot be directly understood by a processing engine to a form that is readily interpretable by the processing engine. The computing system 102 achieves this result, in part, by leveraging the deep knowledge of the language model 104 to draw insight from a free-form query. These capabilities make it easy for a novice user to immediately begin using the computing system 102 without any prior familiarity with the computing system 102. These capabilities also enable a user to quickly converge on acceptable output results in a reduced amount of time with reduced effort, e.g., by reducing a number of queries that are needed to obtain the acceptable output results. By reducing the complexity of the user's interaction with processing engines, the computing system 102 also reduces the computer system's use of resources (e.g., memory resources and processing resources).

Further still, the computing system produced high-quality output results that provide map-related information. For instance, in a routing context, the computing system 102 produces efficient routes having intelligently-chosen waypoints. Such a route ultimately enables a user to traverse a region in an efficient manner (e.g., by more quickly reaching a target destination, while satisfying any query-specific constraints that the user may have specified in a complex free-form query).

Figure 24:
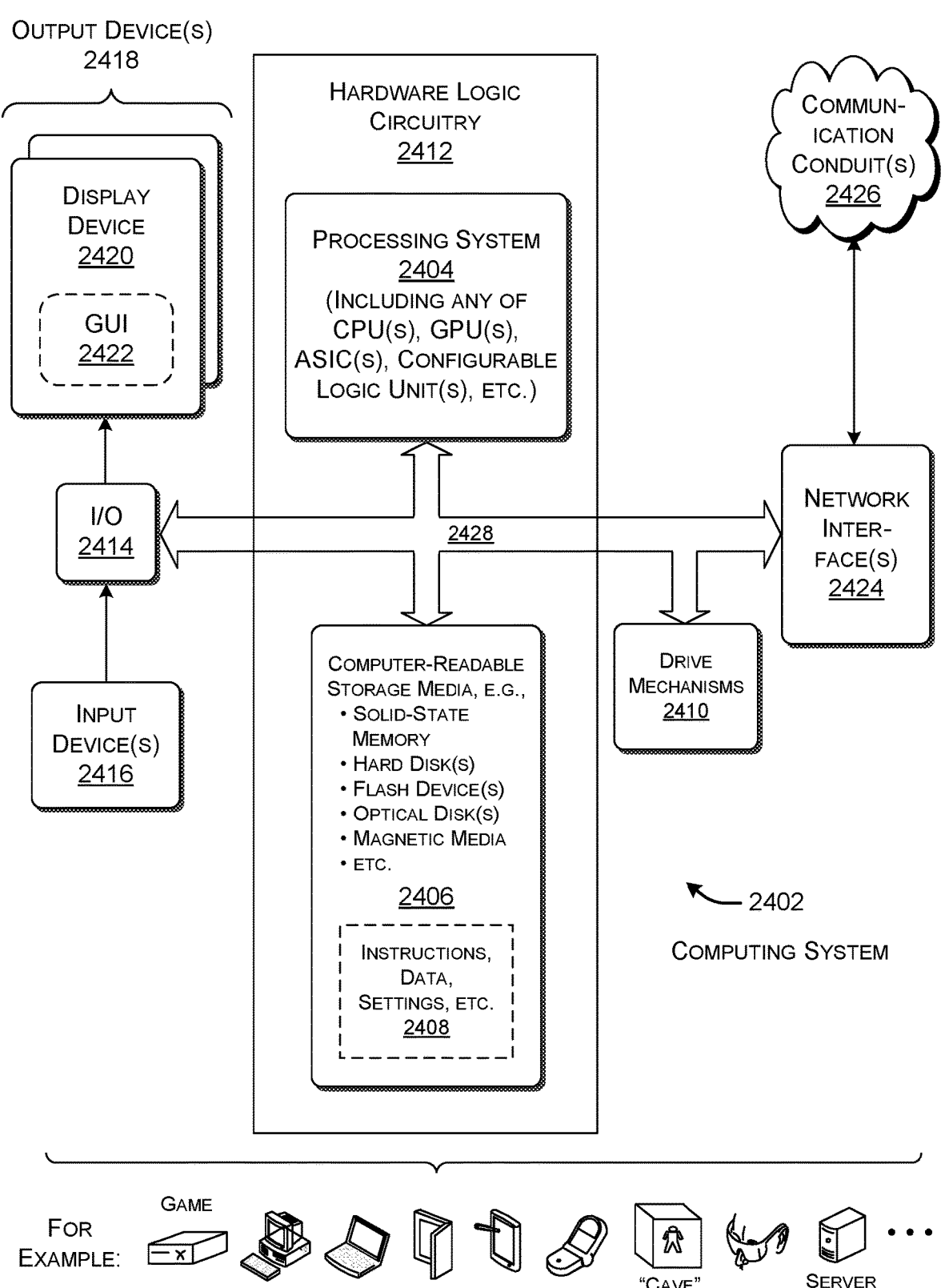
FIG. 24 shows an illustrative type of computing system that, in some implementations, is used to implement any aspect of the features shown in the foregoing drawings.

This section provides an overview of the computing system 102. By way of terminology, in some examples, terms such as "component," "module," "engine," and "tool" refer to parts of computer-based technology that perform respective functions. FIGS. 23 and 24, described below, provide examples of illustrative computing equipment for performing these functions. In some examples, a machine-trained model refers to computer-implemented logic for executing a task using machine-trained weights that are produced in a training operation. In some examples, a "weight" refers to any type of parameter value that is iteratively produced by the training operation. In some examples, a "token" is a unit of information processed by a machine-trained model, such as a word or a part of a word. In some examples, an "embedding" refers to a vector in a vector space that distributes its information over its k dimensions. A distributed vector expresses the semantics of a data item in a dense manner, and is in contrast to a sparse one-hot vector that allocates particular dimensions of the vector to particular concepts.

In some implementations, the language model 104 processes text-based tokens, to identify text-based target items. In other implementations, the language model 104 is capable of processing different types of tokens, such as text-based tokens, image-based tokens, video-based tokens, and/or audio-based tokens. However, to facilitate explanation, the description to follow principally focuses on examples in which the language model 104 processes text-based tokens. In some examples, the language model 104 is specifically a generative model. A generative model is a model which synthesizes a response based on input data. There is no expectation that an output of the generative model exactly matches any training example in a training corpus. Further, in some examples, the generative language model constitutes a large language model (LLM). An LLM is a language model having a large number of weight, such as, in some cases, over one billion weights.

The language model 104 generally functions as a pattern-matching engine. That is, given a set of input tokens, the language model 104 makes a prediction of the text that is likely to follow the set of input tokens. In some implementations, the language model 104 performs this task in an auto-generative manner in plural passes, token by token. The language model 104 is able to function in this manner because its weights capture statistical patterns. A training system (not shown) produces the weights by processing a large corpus of training examples, e.g., using stochastic gradient descent in combination with back projection.

In some implementations, the language model 104 includes a general-purpose set of weights that is not tuned for any application. As such, the language model 104 is not specifically designed for the specific functions performed by the computing system 102. Rather, the language model 104 is primed to perform the functions of the computing system 102 through a series of engineered seed prompts, described below.

In other cases, the training system fine-tunes the weights of a pre-trained language model to perform the functions of the computing system 102. Pre-training for generative language models can include supervised training using language modeling (e.g., predicting the next word in a given text passage and comparing the prediction with the actual next word) and supervised training (e.g., predicting an output result and comparing the prediction with a ground-truth result). Background on the general task of pre-training language models is provided in Radford, et al., "Improving Language Understanding by Generative Pre-training," OpenAI, San Francisco California, Jun. 11, 2018, 12 pages. In yet other implementations, the training system trains the weights of the language model 104 to perform the functions of the computing system 102, starting from "scratch," without pre-training.

In some cases, the language model 104 is a transformer-based model. Further details regarding this type of model are set forth below in Section F. A publicly available transformer-based model for performing pattern completion is the BLOOM model available from HUGGING FACE, INC., of New York, New York, one version of which is Version 1.3 released on Jul. 6, 2022. Another publicly available language model is described in Touvron, et al., "LLaMA: Open and Efficient Foundation Language Models," arXiv, Cornell University, arXiv:2302.13971v1 [cs.CL], Feb. 27, 2023, 27 pages. Other implementations of the computing system 102 use other types of machine-trained models, including fully-connected feed-forward neural networks (FFNs), convolutional neural networks (CNNs), recursive neural networks (RNNs), stable diffusion models, and so on, or any combination thereof.

The management component 108 includes an input/output interface 110 for receiving a last-entered input query 112. In some implementations, the query 112 is submitted in the context of a dialogue session in which one or more previous queries (including queries 114, 116, etc.) have also been submitted. The input/output interface 110 provides output information 118 that expresses an outcome of processing performed by the computing system 102 and other feedback provided by the computing system 102. The input/output interface 110 accommodates plural modes of input, including a key input mode, a voice-recognition input mode, and so on. Likewise, the input/output interface 110 delivers the output information 118 in any mode, including a visual presentation mode, a voice mode, etc.

A control component 120 acts as a master agent which orchestrates all functions performed by the computing system 102. For instance, the control component 120 governs the invocation of the language model 104 and each processing engine in the multi-engine system 106. In some implementations, the control component 120 performs this task by executing a computer program.

The control component 120 interacts with a dialogue history provided in a data store 122. The dialogue history specifies all previous input queries received in a dialogue session, and each language-model response provided by the language model 104 in response to a previous input query. In some implementations, the control system 120 also uses environment-specific rules to determine whether it is appropriate to persist and reuse queries entered by a user in one or more prior dialogue sessions. For example, in some implementations, the control component 120 retains an input query (and its corresponding model response) if the user has entered this input query more than a prescribed number of times in prior dialogue sessions. To function in this manner, the control component 120 maintains frequency information that expresses patterns in the query-submission behavior exhibited by each particular user and/or a group of users.

A prompt-generating component 124 generates a prompt to submit to the language model 104 upon each interaction with the language model 104. The prompt includes a series of text tokens. More specifically, in some cases, the prompt includes the concatenation of two parts: a seed prompt and a query prompt. The query prompt expresses at least the current query 112. The seed prompt (also refers to an instruction prompt) typically describes a task that the language model 104 is being asked to perform. When provided to the language model 104, the seed prompt serves the purpose of guiding or "priming" the language model 104 to process input information in a particular way, and to provide output information in a particular format. A data store 126 provides a repository of function-specific seed prompts. When needed, the prompt-generating component 124 draws an appropriate function-specific prompt from this data store 126. Section D describes an illustrative collection of such function-specific seed prompts. Note that every prompt sent to the language model 104 need not contain a seed prompt preamble. For example, in some cases, the prompt-generating component 124 generates an initial prompt that includes a seed prompt pertaining to a particular function. The prompt-generating component 124 need not include the same seed prompt in subsequent prompts it generates, insofar as the subsequent prompts pertain to the same function.

In some implementations, the prompt-generating component 124 produces a query prompt that also expresses context information drawn from the dialogue history stored in the data store 122. For example, the prompt-generating component 124 includes prompt information that, in addition to the current query 112, expresses at least the last K input queries that have been submitted, and the last K responses that have been produced by the language model 104 in response to those queries (where K is an environment-specific integer). In other implementations, the prompt-generating component 124 asks the language model 104 to perform the preliminary task of providing a more succinct digest of the dialogue history that is most relevant to the current query 112. Thereafter, the prompt-generating component 124 uses the digest of the dialogue history in composing its prompts, rather than the complete dialogue history.

One or more result-checking components (RCC) 128 validate the output results generated by the computing system 102 before delivering the output results to a user. For instance, the RCC 128 determines whether a candidate route has a spatial distribution of locations that fails a spatial compactness test. In addition, the RCC determines whether a travel time associated with the candidate route deviates from an ideal reference travel time by more than a prescribed amount. If any of these conditions are met, the RCC 128 prevents the anomalous candidate route(s) from being suggested as viable routes. For example, based on its analysis, the RCC 128 would likely reject a California-centric route that has one leg jutting out to the island of Hawaii. Note that other components of the computing system 102 can detect anomalous output results as part of their core functions.

Now referring to the multi-engine system 106, when invoked, an image search engine (or engines) 130 retrieves an image from a data store 132 that pertains to a topic expressed in the query 112. The data store 132 may be one of a plurality of data stores that store different collections of images. For example, the computing system 102 relies on a first collection of travel-related images to illustrate a route being proposed or other travel-related subject matter. A query that invokes the retrieval of one of these travel-related images is said herein to exhibit a travel intent. The computing system 102 relies on a second collection of atlas images when the query 112 asks for information about a particular region other than its roadways. For example, the query 112 asks about any of the following types of information pertaining to a particular region: any kind of scientific information (e.g., geological information, climatological information, zoological information, and/or botanical information); any kind of historical information (e.g., regarding historical conditions in the particular region or historical events that took place in the particular region); any type of news-related information regarding current events that occurred in the particular region, and so on. This type of query is said herein to evince an atlas intent.

In some implementations, a routing intent reflects the fact that a user is explicitly or implicitly requesting driving directions within a particular region. A travel intent suggests that the user has the more general goal of exploring or visiting the particular region, in some cases, for pleasure, curiosity, etc., and/or would otherwise benefit from the presentation of a travel-related image (or images). Depending on the wording of the query, the language model 104 will detect either a routing intent or a travel intent, or both a routing intent and a travel intent. For example, the language model 104 may detect just a routing intent for a query that reads "I want directions from St. Regis, Montana to Kalispell, Montana, as quick as I can get there." The language model 104 may invoke both the routing intent and the travel intent for a query that reads, "I want to see beautiful scenery on my way from St. Regis, Montana to Kalispell, Montana, even if takes me a bit out of the way." In the former case, the user's query evinces a strictly utilitarian goal of reaching Kalispell in the least amount of time. In the latter case, the user appears to be taking the trip, at least in part, for pleasure. A query that states "Show me beautiful locations while I am in Kalispell this August" might invoke just the travel intent. The language model 104 detects an atlas intent whenever the query evinces an interest in a topic that goes beyond travel, as when the user asks, "Show me beautiful locations in Kalispell and information about the wildlife in the region." The atlas intent can coexist with any other intent(s) mentioned above, or may be only intent that the language model invokes for a particular query.

When invoked, a geocoding engine 134 specifies the locations of entities expressed by a query. In addition, the geocoding engine 134 retrieves other metadata pertaining to the entities. For example, for the case in which an entity corresponds to a place of business, the geocoding engine 134 can identify the type of business associated with the entity. The geocoding engine 134 uses any retrieval algorithm to search a data store 136 that provides map-related information.

When invoked, a routing engine 138 generates one or more candidate routes that connect the entities mentioned in a query. To perform this task, the routing engine 138 interacts with a data store 140 of roadway information. The roadway information describes the road network in a particular region, the properties of the roads in the road network, the current conditions of the roads (e.g., whether they are currently experiencing traffic congestion), and so on.

A chat engine 142 engages in a chat session with the user in connection with the functions performed by the computing system 102. In some implementations, the chat engine 142 is an intermediary that receives all queries provided by the user, and that provides all messages and output information sent to the user. In this implementation, the input/output interface 110 directly interacts with the chat engine 142. In other implementations, the computing system 102 only invokes the chat engine 142 to handle some communication tasks, such as conveying a request to the user to provide additional information, and then receiving any additional information that the user supplies in response thereto.

Other implementations use additional engines and/or omit one or more of the engines mentioned above. For example, another engine determines a location of a user using one or more techniques. For example, this type of engine determines the location of the user based an IP address or other ID associated with the user, e.g., using a lookup table that maps IP addresses to locations. Another engine performs a search within a specific region for an entity of interest, such as a particular kind of business. Another engine recommends an entity (such as a place) based on one or more factors specified by a user, and so on.

In some implementations, the management component 108 interacts with each of processing engines using an engine-specific application programming interface (API) hosted by the processing engine. To complement this manner of operation, the seed prompts guide the language model 104 to ingest input information in a format expected by a particular processing engine, and to provide a response in a format that is readily ingestible by the processing engine.

Section B. Illustrative Processing Flows

Figure 2:
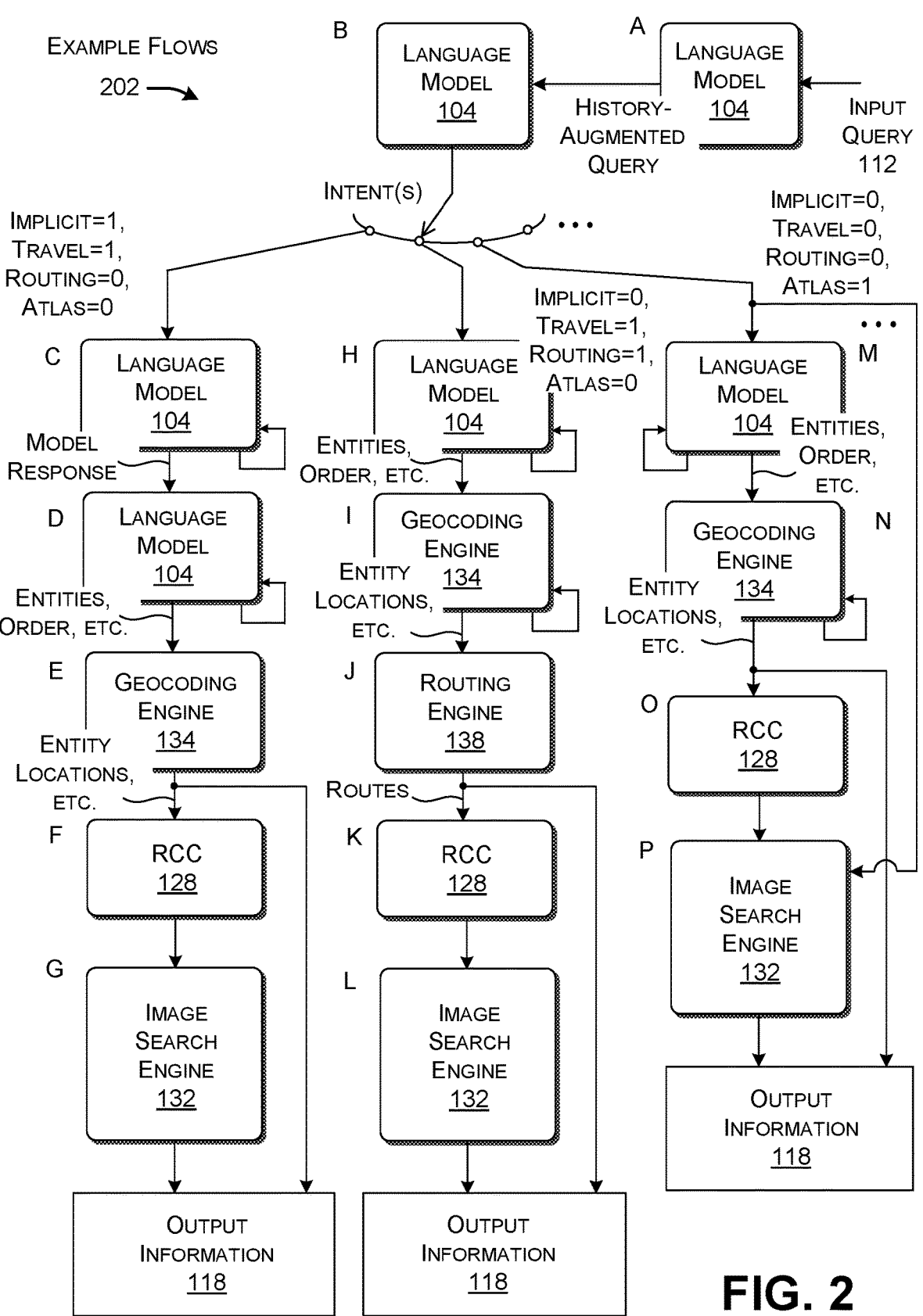
FIG. 2 shows illustrative processing flows implemented by the computing system of FIG. 1 for various combinations of intents.
Figure 3:
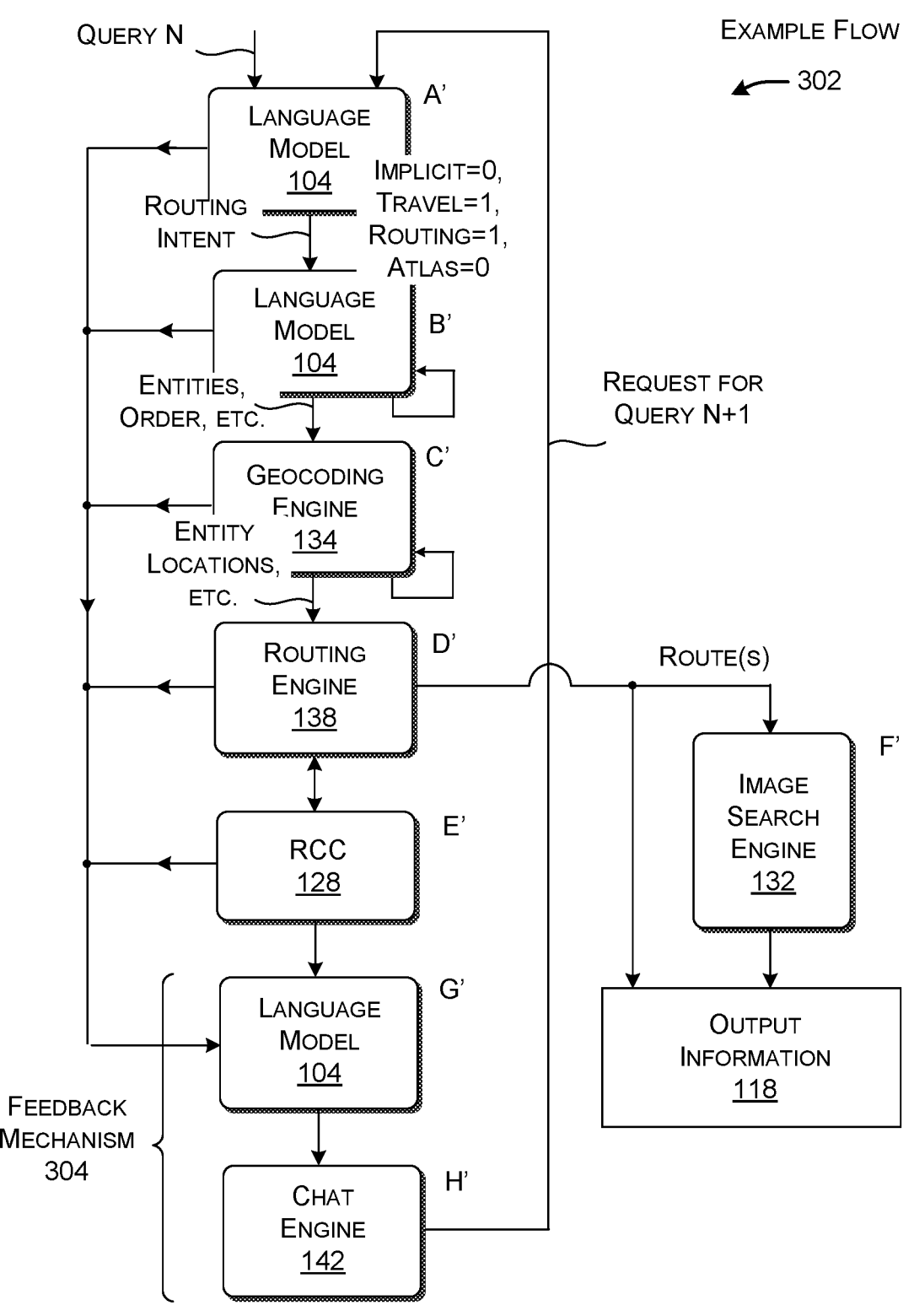
FIG. 3 shows an illustrative processing flow implemented by the computing system of FIG. 1 that incorporates a feedback mechanism.

FIGS. 2 and 3 show illustrative processing flows (202, 302) that the computing system 102 performs for particular input cases. More generally, the computing system 102 executes a specific processing flow based on a context established by the current query 112. The processing flows shown in FIGS. 2 and 3 represent only representative examples of a much larger universe of possible context-specific processing flows. In these figures, some components (such as the language model 104) appear multiple times; this is meant to show different invocations of the same processing component at different stages, rather than separate physical instances of that processing component.

With respect to FIG. 2, each processing flow commences when a new query 112 is received. In some implementations, in stage A, the prompt-generating component 124 makes an initial call to the language model 104, asking the language model 104 to determine whether there is any portion of the dialogue history that is relevant to the query 112. If so, the language model 104 augments the query 112 with information extracted from the dialogue history. This yields an augmented query. In other implementations, the prompt-generating component 124 augments the query based on one or more rules. Each rule describes a particular case in which information is extracted from prior input queries and associated responses, and then integrated into the input query 112. For example, consider a first query that reads "1 Market Street, San Francisco to San Jose," and a second query that reads "Show me free parking near 1 Market Street?" An address completion rule specifies that "San Francisco," which is extracted from the first query, should be appended to the end of the second query, to produce, "Show me free parking near 1 Market Street, San Francisco?" Subsequent mentions of the query 112 refer to the augmented query, although not explicitly stated in each case.

In other implementations, the control component 120 calls the language model 104 to make an augmentation decision at other junctures in the processing flows shown in FIG. 3. These implementations account for the fact that different portions of the dialogue history may be relevant to performing different functions by the processing flows, and therefore it is appropriate to make a function-specific augmentation decision prior to each function being performed.

In stage B, the control component 120 next calls on the language model 104 to identify the intent (or intents) expressed by the query 112. The language model 104 responds by determining which intent of a predetermined set of intents are relevant to the query 112. The language model 104 provides an output result which expresses its intent-determination conclusions.

In some implementations, the predetermined set of intents includes an implicit intent, a route-finding intent, a travel intent, and an atlas intent. An implicit intent is appropriate for those cases in which the query 112 expresses an entity-of-interest in any indirect manner, e.g., by specifying a property of the desired entity. For example, a query that asks for a scenic route between two locations is an implicit query because it does not explicitly specify the waypoints along the way. A query that asks for a particular type of business is an implicit query because it does not pinpoint a singular business establishment having a singular location.

A route-finding intent expresses a desire to find at least one route that satisfies certain criteria. In some cases, the route-finding intent is also an explicit intent because it specifically identifies the waypoint between a source location and a destination location. In other cases, a route-finding intent is also an implicit intent because it allows the language model 104 and the routing engine 138 to select specific waypoints that satisfy matching criteria specified by the query 112.

As previously stated, a travel intent expresses a request to illustrate an output result using at least one travel-related image. For example, a travel intent expresses a request for the image search engine 130 to supply one or more travel-related images that illustrate a route selected by the routing engine 138. An atlas intent expresses a request for an atlas image that shows auxiliary characteristics of a region-of-interest, not necessarily pertaining to the road network of the region-of-interest. These four intents are mentioned in the spirit of illustration; other environments incorporate additional intents and/or omit one or more of the intents mentioned above.

The control component 120 next performs a multiplexing operation on the basis of the detected intent(s). That is, the control component 120 invokes a particular processing follow for each combination of intents that has been detected. FIG. 2 represents a possible repeated call to the language model 104 using a looping arrow that points back to the language model 104. For example, a looping arrow annotates the language model 104 at stage C shown in FIG. 3. This notation indicates that the function performed by the language model 104 can involve plural calls to the language model 104.

The leftmost series of blocks illustrate one implementation of a processing flow that is appropriate for the case in which the query 112 has the following intent profile: implicit intent is Yes; travel intent is Yes; route-finding intent is No; and atlas intent is No. In stage C, the control component 120 calls on the language model 104 to provide a response to the query 112. For example, if the query asks about the places featured in the scenes of a particular movie in order of appearance, the language model 104 provides a response that names those cities and their order of appearance. In brief, the language model 104 answers the question posed by the query 112, if possible. Next, in stage D, the control component 120 asks the language model 104 to extract all entities mentioned in the query 112 and/or the associated response.

More specifically, at stage C, the language model 104 is instructed to provide a list of the entities that it has detected, arranged in the order in which the entities are to be connected together by a route, or otherwise presented in an output presentation. Alternatively, the language model 104 is instructed to convey that no order is implicated by the query, if it reaches this conclusion. In addition, the language model 104 can identify any other characteristic of an entity, such as its type.

In addition, in some implementations, the control component 120 instructs the language model 104 to classify each entity it detects as primary or secondary. A primary entity has a higher priority than a secondary entity. A priority level generally refers to level of importance that a user is presumed to attach to an entity. For example, in some cases, the user plans a trip for the purpose of visiting a primary entity, and selects secondary entities associated with activities that are supplemental to the main purpose of the trip. In other words, the secondary entities are dependent satellites of the primary entity. In other cases, the language model 104 discriminates between a primary entity and a secondary entity in ways that are subtle, and do not conform to a particular rule; this is because the language model 104 captures statistical patterns exhibited by a large number of training examples, many of which do not conform to any self-evident rule.

In many cases, a primary entity is a unique place having a single location. By contrast, the query 112 often specifies a secondary entity by broadly describing its class or the activity that will take place at the entity (e.g., "coffee," or "dinner"). Since the routing engine 138 is given more options in selecting secondary entities, the routing engine 138 can treat the primary entity as an anchor, and then selects secondary entities that are located nearby the primary entity.

Next, at stage E, the geocoding engine 134 identifies a specific longitude and latitude associated with each entity, and/or other entity location information (such as a geohash). In some cases, the geocoding engine 134 can also retrieve additional metadata regarding the entities mentioned in a query. In stage F, the result-checking component (RCC) 128 validates the viability of the output results reached thus far by performing one or more checks on the output results. In some cases, the RCC 128 identifies and excludes anomalous output results.

Next, in stage G, the control component 120 generates an output presentation based on the output results of the leftmost processing flow. In some implementations, the control component 120 specifically generates output results using an interactive map that shows the locations of entities expressed by the query. Since the travel intent has been invoked, the control component 120 also calls on the image search engine 130 to find one or more images that are relevant to the query 112. The control component 120 presents the auxiliary image(s) with the interactive map, e.g., by presenting the auxiliary image(s) alongside the interactive map.

The center series of blocks illustrates one implementation of a processing flow that is appropriate for the case in which the query 112 has the following intent profile: implicit intent is No; travel intent is Yes; route-finding intent is Yes; and atlas intent is No. In other words, the query 112 explicitly specifies a route-finding request, in which the entities to be visited are explicitly identified.

First, in stage H, the control component 120 calls on the language model 104 to extract the explicitly-stated entities expressed by the query 112. The language model 104 also specifies the order in which those entities are to be visited, if applicable. All queries need not implicate an order. For example, assume that a user expresses a desire to visit two places that are equidistant from a hub at which a principal activity will take place (e.g., a conference). Unless the query 112 itself expresses a preference as to which place should be visited first, the user's query does not itself evince a temporal distinction between the two visits.

Next, in step I, the geocoding engine 134 identifies the locations of the referenced entities. In step J, the routing engine 138 generates one or more proposed routes that connect the entities together in the specified order (if any). In step K, the RCC 128 validates each proposed route. In step L, the image search engine 130 retrieves one or more travel-related images that are relevant to the query 112 (e.g., which show the road network near waypoints). The control component 120 displays an interactive map that shows at least one proposed route together with the retrieved travel-related image(s).

The rightmost series of blocks illustrate one implementation of a processing flow that is appropriate for the case in which the query 112 has the following intent profile: implicit intent is No; travel intent is No; route-finding intent is No; and atlas intent is Yes. In this case, in stage M, the language model 104 invokes the language model 104 to extract any entities mentioned in the query 112, and an order implicated by the query 112 pertaining to the temporal sequencing of those entities, if any. In stage N, the geocoding engine 134 identifies the locations of the entities. In stage O, the RCC 128 validates the findings that have been produced thus far. In stage P, the image search engine 130 retrieves at least one atlas image that is relevant to the input query 112. The control component 120 displays an interactive map of the region(s) identified by the query, accompanied by one or more atlas images that have been retrieved by the image search engine 130.

FIG. 3 shows a variation of the route-processing flow of FIG. 2. In particular, the route-processing flow of FIG. 3 incorporates a feedback mechanism 304 that enables the user to supply one or more follow-up queries. In some cases, the control component 120 explicitly asks the chat engine 142 to solicit additional information from the user. For example, the computing system 102 determines that it cannot resolve the user's request without obtaining one or more items of additional information. Here, the feedback mechanism 304 attempts to collect the missing information. In other cases, the computing system 102 receives additional information independently provided by the user (e.g., without being prompted to do so by the computing system 102).

First, in stage A', the control component 120 calls on the language model 104 to identify the intent associated with the input query 112 (which corresponds to the Nth input query in a dialogue session). (Again, the query 112 that is processed by the pipeline of FIG. 3 may correspond to an augmented query that incorporates dialogue history information.) Assume that the language model 104 indicates that the following intent profile applies to the query 112: implicit intent is No; travel intent is Yes; route-finding intent is Yes; and atlas intent is No. The computing system 102 next carries out the same sequence of operations set forth the middle processing flow of FIG. 2. That is, in stage B', the language model 104 extracts the entities mentioned in the query 112 and specifies the temporal order in which the entities are to be visited (if applicable). In stage C', the geocoding engine 134 identifies the locations associated with the query 112. In stage D', the routing engine 138 identifies one or more proposed routes, each of which links the identified entities in the specified order. In stage E', the RCC 128 validates the findings reached by the computing system 102 thus far.

At any given stage in the above-described processing flow, the computing system 102 may reach a conclusion that there is some deficiency in the input query 112 that prevents the generation of a high-confidence output result. For example, at the outset of the flow, the language model 104 can determine that it cannot determine the intent underlying the query 112 with sufficient confidence. Alternatively, or in addition, the geocoding engine 134 can fail to resolve the location of a specified entity. Alternatively, or in addition, the routing engine 138 can encounter some ambiguity in the query's directive that prevents it from finding any route with sufficient confidence. In any of these circumstances, the control component 120 calls upon the feedback mechanism 304 to solicit additional information from the user. Otherwise, in stage F', the control component 120 presents the output information 118. The output information 118 includes an interactive map that shows at least one proposed route produced by the routing engine 138 and any supplemental image(s) retrieved by the image search engine 130.

In some implementations, the feedback mechanism 304 makes use of the language model 104 and the chat engine 142. That is, in stage G', the control component 120 first calls on the language model 104 to generate an output message that is appropriate for the particular problem encountered by the computing system 102 in processing the original query 112. That is, in stage G', the input information fed to the language model 104 expresses the encountered problem; the output message produced by the language model 104 formulates a request to the user to solve the problem by providing missing information. For example, assume that the processing flow immediately breaks down because the language model 104 cannot resolve the intent(s) of the query 112. If so, the language model 104 generates a message that invites the user to more explicitly specify the objective they want to accomplish. Alternatively, the computing system 102 selects an appropriate message from a data store of pre-generated messages. For example, the computing system 102 performs this function by searching an index of responses, based on a key that expresses information regarding a current problem. In stage H', the control component 120 instructs the chat engine 142 to present the message (in whatever manner it is produced), and collect any information provided by the user in response to the message.

Section C. Illustrative Output Presentations

FIGS. 4-8 show illustrative output presentations produced by one implementation of the computing system 102. Other implementations vary any aspect of these output presentations, e.g., by changing the selection of items to be presented, by changing the graphical arrangement of the items, and/or by changing the controls by which a user is able to interact with the output presentations. The computing system 102 presents these presentations using any output device or combination of output devices, including any type of display device, a speaker (for reading text out to the user), and so on.

Beginning with FIG. 4, the computing system 102 displays an output presentation 402 for a query with an intent profile that specifies: implicit intent is yes; travel intent is Yes; route-finding intent is Yes; and atlas intent is No. More specifically, the output presentation 402 is produced in response to the user inputting a query that asks about a route traversed by the Depression-era main characters in a novel by the author John Steinbeck, with the tile *The Grapes of Wrath*. A field 404 specifies the query. A field 406 specifies the current location of the user who submits the query (which is information that is not particularly relevant to the interpretation of this query). A command 408, upon its activation, causes the query to be submitted to the computing system 102. A field 410 shows a text-based response to the query produced by the processing flow. A field 412 shows an interactive map that plots the likely path of the characters in the novel from Oklahoma to California.

The text-based response and the associated interactive map reflect, in part, insights drawn by the language model 104, based on the statistical patterns expressed by its machine-trained weights. A training system learns those weights by processing a large number of text fragments, some of which are directly or indirectly relevant to the subject under consideration in FIG. 4. This type of knowledge would be very difficult, if not impossible, for a developer to hardcode in the form of an explicit set of rules.

FIG. 5 shows an output presentation 502 that is presented in response to the input of a query that reads: "Also show a map of dust storm impact in the Great Depression." First, the control component 120 relies on the language model 104 to properly conclude that the inquiry of FIG. 5 is a continuation of the inquiry commenced for the scenario of FIG. 4. In other words, the language model 104 interprets the query entered in the example of FIG. 5 as a follow-on to the query entered in the example of FIG. 4. In response, the language model 104 produces an augmented input query that incorporates some or all of the content of the query entered in the example of FIG. 4. The control component 120 then asks the language model to assess the intent of the augmented query. The intent is the same as that specified in FIG. 4, except that the atlas intent is now Yes.

More specifically, a field 504 presents the new query. A command 506, upon its activation, causes the query to be submitted to the computing system 102 for processing. A field 508 shows the same interactive map as the example of FIG. 4, illustrating the route taken by the characters in Steinbeck's novel. A field 510 shows an atlas image retrieved by the image search engine 130 based on the query. The atlas image specifically shows the severity of dust storm damage across the Midwest and Southwest regions of the United States during the Great Depression. When viewed in tandem with the interactive map, the atlas image enables the user to gain additional insight into the challenges faced by the characters in the novel.

Different implementations present auxiliary images, relative to an interactive map (or other anchoring presentation), in different respective ways. In some implementations, the computing system 102 presents the auxiliary images next to the interactive map. Alternatively, or in addition, the computing system 102 overlays at least one auxiliary image on top of the interactive map. The auxiliary image is presented with a level of semi-transparency that prevents it from entirely obscuring the underling interactive map. Alternatively, or in addition, the computing system 102 links an auxiliary image to a particular feature in the interactive map, e.g., by including a hyperlink to the auxiliary image at a particular location in the interactive map. Alternatively, or in addition, the computing system 102 presents an interactive auxiliary image that is integrated with the interactive map. Here, zooming in on a particular region of the interactive map will cause the computing system 102 to zoom in on a corresponding part of the auxiliary image, in lockstep with the user's actions directed to the interactive map. Likewise, zooming in on a particular part of the auxiliary image causes corresponding actions to be taken with respect to the interactive map. Still other presentation variations are possible.

Figure 6:
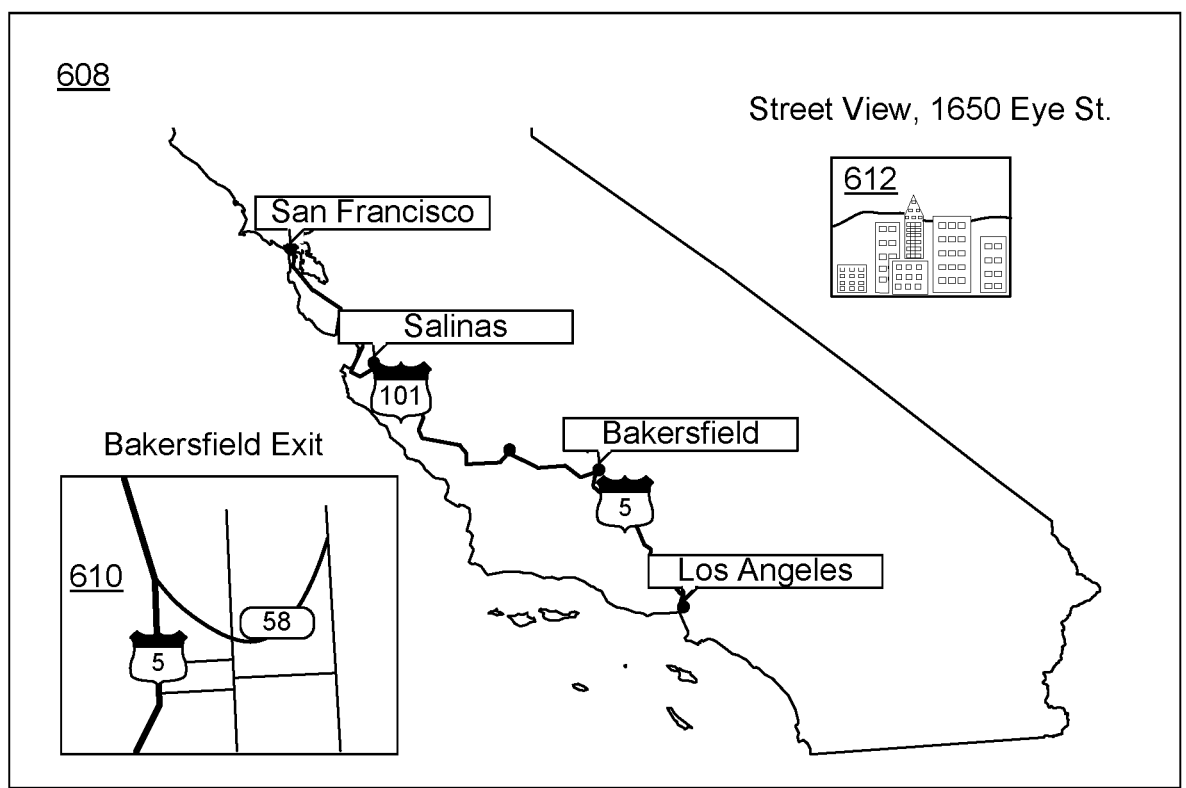
FIG. 6 shows an output presentation generated by the computing system of FIG. 1 for the case in which the query expresses a route-finding intent, in which the points along the route are explicitly specified.

FIG. 6 shows an output presentation 602 that is presented in response to the input of a query that reads: "On my week off, I want to travel from San Francisco to Los Angeles, visiting Salinas and Bakersfield along the way." When prompted, the language model 104 determines the following intent profile for this query: implicit intent is No; travel intent is Yes; routing intent is Yes; and atlas intent is No. Note that, although the query explicitly specifies the beginning and ending locations of the route, and two waypoints along the way, it does not explicitly specify whether Salinas should be visited before Bakersfield, or vice versa. But the language model 104 and/or the routing engine 138 will reach this conclusion because Salinas lies to the north of Bakersfield, and it would be highly inefficient (and non-direct) to visit Bakersfield, and then backtrack to visit Salinas, with an ultimate destination of Los Angeles. The language model 104 invokes the travel intent because it appears that the user is taking the trip, at least in part, for non-utilitarian reasons.

A field 604 shows the input query. A command 606, upon its activation, causes the query to be submitted to the computing system 102 for processing. A field 608 shows an interactive map of California, including a proposed route generated by the routing engine 138. A field 610 shows a first travel-related image pertaining to Bakersfield (e.g., showing a local map of the road network in Bakersfield), and a field 612 shows a second travel-related image pertaining to Bakersfield (e.g., showing a street view of a location in Bakersfield). Assume that the computing system 102 recommends these two images because the user's present location (not shown) indicates that the user is currently located closest to the city of Bakersfield.

Figure 7:
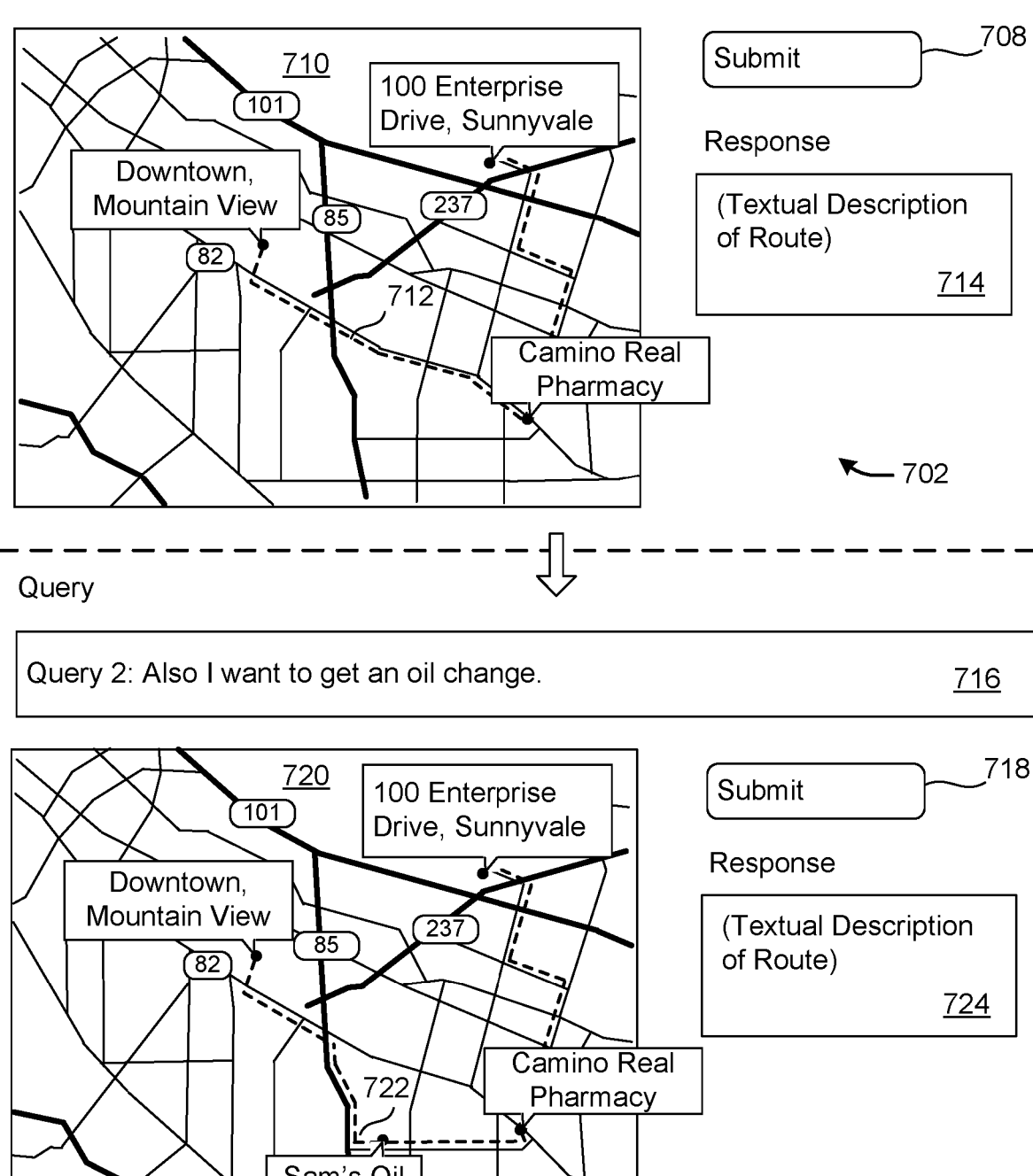
FIG. 7 shows an output presentation generated by the computing system of FIG. 1 for the case in which two successive queries are submitted that express a route-finding intent. That is, the second query supplements information imparted by the first query.

FIG. 7 shows an output presentation 702 that is presented in response to a first input query: "Can you show me the fastest route from 1020 Enterprise to Downtown Mountain View, stopping in between at a pharmacy?" FIG. 7 also shows an output presentation 704 that is presented in response to a follow-up query: "Also I want to get an oil change." This is a series of queries that existing map-processing engines cannot effectively handle. First, a conventional map-processing engine will not know how to process the relationship "in between" in the first query. Second, a conventional map-processing engine will not know how to process the second query because it is a fragment, and there is nothing explicitly stated that links it to the first query.

Referring first to the first output presentation 702, when invoked, the language model 104 identifies the following intent profile for the first query: implicit intent is Yes; travel intent is No; route-finding intent is Yes; and atlas intent is No. The intent is implicit because the query specifies a type of business to be visited (a "pharmacy"), without identifying a particular pharmacy establishment having a specific location. A field 706 identifies the first query. A command 708, upon its activation, causes the first input query to be submitted to the computing system 102 for processing. A field 710 shows an interactive map of the region-of-interest, highlighting one proposed route 712. A field 714 presents a textual description of the route 712 (the specific text being omitted in FIG. 7). Here, the language model 104 does not invoke the travel intent because the user is requesting a route for presumably purely utilitarian reasons. The fact that the request is local in nature further suggests a utilitarian objective, since a local user is likely to already know about local sites of interest.

With respect to the second output presentation 704, the language model 104 first confirms that the second query is indeed to be interpreted in conjunction with the first query. The language model 104 also generates an augmented query that represents a union of the second query with at least some information extracted from the first query. The language model 104 then identifies the intent of the second query. The intent profile of the second query is the same as the first query.

A field 716 presents the second query. A command 718, upon its activation, causes the second query to be submitted to the computing system 102 for processing. A field 720 shows an updated map of the region-of-interest, with an updated route 722. Note that the route 722 has changed to encompass the additional waypoint specified by the second query. A field 724 provides a text-based expression of the route 722.

FIG. 8 show a final output presentation 802 that is presented for a similar scenario to that described above for the case of FIG. 7. Here, the user enters a query: "Give me directions to the CES 2024 conference in Las Vegas. Before the conference, I want to stop by a First Trust Bank branch, get coffee, and drop off clothes at a dry cleaner." The language model 104, when invoked, determines that this query has the same intent profile as the case of FIG. 7. In the case of FIG. 8, the query specifies three waypoints in an implicit manner, rather than identifying the locations of particular establishments. The query lists the waypoints (bank, dry cleaner, coffee shop) in a particular order, but there is no indication in the query that the user requires these waypoints to be visited in the given order.

Assume that the control component 120 calls on the language model 104 to extract all of the entities mentioned in the query, including the target destination, and the three waypoints. In doing so, the language model 104 identifies the names of the waypoints (e.g., first trust bank, dry cleaner, and coffee shop). In the same or a different call, the control component 120 asks language model 104 to identify the priority level associated with the entities. Assume that the language model 104 concludes that "CES 2024 conference" is a one-off event that constitutes a primary entity. The language model 104 identifies the remainder of the entities as secondary entities. In this case, it is clear that the CES conference is an anchoring activity, and is the principal reason that the user has visited Las Vegas (and not, for instance, to get coffee at a particular establishment).

The control component 120 calls on the geocoding engine 134 to identify particular business locations associated with the detected entities. At this stage, the geocoding engine 134 can enumerate all the First Trust Bank branches, coffee shops, and dry cleaners within a prescribed maximum distance from the CES 2024 conference site. Next, the control component calls on the routing engine 138 to generate a proposed path.

At some point in the route-finding flow, the computing system 102 determines that the query is incomplete because it does not specify the location from which the user departs. This is an important constraint because it influences the selection of waypoints. As a default, the language model 104 is configured to use the user's current location as the source location. But in some contexts, it is clear the user's present location (e.g., New York City or London) is not relevant to the route being planned. Alternatively, the user's present location is not known.

In some cases, the language model 104 reaches the conclusion that the source location is missing at some stage of its processing. If not, the routing engine 138 will determine that it is lacking a key constraint. In response, the computing system 102 invokes the feedback mechanism 304 to solicit additional information from the user. In particular, the control component 120 invokes the language model 104 to generate a message that describes the query's specific deficiency, and the control component 120 invokes the chat engine 142 to present the message to the user and to collect the user's response thereto. Assume that the user responds to the message by specifying the hotel from which the user will depart the day of the conference.

A field 804 shows the first query. A field 806 shows the second query entered in response to an instruction 808 to enter specific additional information. A field 810 presents the region-of-interest and a proposed route 812 produced by the routing engine 138. Note that the routing engine 138 may generate a large number of candidate routes that satisfy the input query, e.g., because there are many candidate coffee shops in the general vicinity of the conference site. The routing engine 138 chooses the most optimal of the candidate routes, e.g., corresponding to the route having the shortest net distance and/or the route having the most spatially compact cluster of points, and/or the route incurring the smallest travel time. This criteria will generally exclude most inefficient paths that involve crisscrossing trajectories and/or large deviations from the principal course of the route. If the routing engine 138 fails to remove such a path, the RCC 128 will eliminate it.

Section D. Illustrative Seed Prompts

The prompt-generating component 124 generates a prompt for submission to the language model 104 that includes, in some cases, a function-specific seed prompt selected from the data store 126, together with a query prompt that expresses the current query and relevant dialogue history information (if applicable). In general, a seed prompt (also referred to as an instruction prompt) specifies an objective of a particular function, and instructions that explain how to perform the particular function. The seed prompt also specifies the format to be used in reporting the result of the function. In some cases, the seed prompt also includes examples of the operation of the function, given particular input queries. This section describes a collection of illustrative function-specific seed prompts.

FIG. 9 serves as an introduction to the objectives of the query-augmenting function, which is the function to which a seed prompt 1002 of FIG. 10 is directed. FIG. 9 specifically shows four ways that two queries (q1, q2), and two associated responses (r1, r2), can be related. In a relationship A, the first query (q1) and its associated response (r1) are not linked in any way to the second query (q2) and its associated response (r2). This relationship might reflect a situation in which the user decides to pursue a new inquiry in the second query, independent of the first inquiry. Further, assume that there is nothing in the first response that has induced the user to submit the second query.

A relationship B indicates that the first query has some relationship to the user's second query. But the user does not draw on the first response when formulating the second query. For example, this relation may describe the situation in which the user enters the second query to clarify an ambiguity in the first query, or add a constraint to the first query (as is the case in the example of FIG. 8).

A relationship C indicates the user formulates the second query by drawing on information imparted by the first response. For example, the user may enter the second query to explore a topic expressed in the first result, without attempting to elaborate on the subject matter of the first query. A relationship D is the union of relationships B and C. Here, the user enters a second query based on information imparted by the first query and information provided by the first result.

The same principles set forth above apply to combinations of queries having more than two queries. As a dialogue session advances, however, it becomes increasingly difficult to manually specify the myriad ways in which the prior queries and responses potentially interrelate. The computing system 102 addresses this problem by using the language model 104 to understand the relationships (if any) between the current query and parts of the dialogue history.

The language model 104 then automatically outputs an augmented query that includes just the relevant parts of the dialogue history. If relationship A is detected, the language model 104 will include no prior dialogue history. If relationship B is detected, the language model 104 will include information regarding at least the previous query. If relationship C is detected, the language model 104 will include information regarding the previous model response. If relationship D is detected, the language model 104 will include information regarding both the previous query and the previous response. The prompt 1002 need not specifically articulate these different cases; it is sufficient for the examples it presents to embody at least some of these different cases. The language model 104 will already incorporate insight into patterns expressed in dialogue histories based on its training. To this end, it is useful for the training examples to include dialogue histories.

Advancing now to FIG. 10, the seed prompt 1002 instructs the language model 104 to produce an augmented query in a case-sensitive manner. The seed prompt 1002 specifically includes a part 1004 that describes: a) the objective of the function (e.g., "You are a helpful assistant designed to understand query history and agent response and include as much relevant information as possible from them into the input query"); b) how the function is to be performed (e.g., "Given Query history, agent response and input query, you should understand the query history and the agent response and output one single query in English adding any relevant information from them into the input query"); and c) how the results of the function are to be reported (e.g., "You need to provide your output in one line"). A part 1006 provides one or more examples of the application of the function, with respect to particular queries. FIG. 10 shows only one example, but a seed prompt 1002 generally includes plural examples. The use of plural examples often increases the ability of the language model 104 to understand the pattern of behavior it is expected to duplicate.

FIG. 11 shows a seed prompt 1102 that instructs the language model 104 to identify particular intents in each input query. The seed prompt 1102 specifically includes a part 1104 that describes the objective of the function (e.g., "You are an assistant designed to extract intent from a query"). A portion 1106 provides one or more examples of how the function is to be performed. The portion 1106 also describe how the results of the function are to be conveyed, e.g., by setting a binary flag value to "1" if a particular intent applies to a query under consideration, or a flag value to "0" if the particular intent does not apply to the query. FIG. 11 specifically shows three examples, but the seed prompt 1102 can include any number of examples.

FIG. 12 shows a seed prompt 1202 that instructs the language model 104 to extract entities specified in a query and specify the order in which the entities are to be connected by the route, if applicable. The seed prompt 1202 specifically includes a part 1204 that describes the objective of the function (e.g., "You are an assistant designed to extract geospatial entities from text"). The part 1204 also explains how the results of the function are to be reported (e.g., "You need to understand if user plans to visit the entities in a temporal order, using words such as 'before', 'after', etc. If so, output the entities in the order and add <T> at the end, otherwise, add <O>." Further, the part 1204 instructs: "You need to identify the start location from the input text. If the start location is not one of the extracted entities, put 'UserLocation' at the beginning of your output." A part 1206 provides one or more examples of how the function is to be performed, given particular queries. FIG. 12 specifically shows a single example, but the seed prompt 1202 can include any number of examples.

FIG. 13 shows a prompt 1302 that the prompt-generating component 124 uses to instruct the language model 104 to discriminate between primary (anchor) entities and secondary entities. The user is presumed to place greater importance on a primary entity compared to a secondary entity. As previously explained, primary entities often have locations that are more fixed compared to secondary entities. For example, a primary entity often (although not always) expresses a place having one unique instantiation. Further, a query often (although not always) places a primary entity first in a list of entities.

The seed prompt 1302 specifically includes a part 1304 that describes the objective of the function (e.g., "In the following search, identify all activities and label them as PRIMARY or SECONDARY"). The seed prompt 1302 defines the distinction between primary and secondary entities as follows: "PRIMARY activities are the most essential activities in a complex user search. There are fewer places and times PRIMARY activities can be performed compared to the SECONDARY activities. SECONDARY activities are less important and can be performed at many places including around the PRIMARY activities in a complex search." A part 1306 defines a desired output format of the function (e.g., "Output format: [Activity]:[Activity type]"). A part 1308 provides one or more examples of how the function is to be performed, with respective to given queries.

The specific wording and arrangement of information in the above-described seed prompts is to be understood as illustrative. Other implementations adopt other seed prompt text wordings and arrangements of information. Further, two or more of the seed prompts can be integrated into a single seed prompt. In response to the receipt of such a seed prompt, the language model 104 is primed to perform several functions. A developer, however, can choose to break the language model's analysis into several stages, as shown in FIGS. 2 and 3, to more effectively focus the language model 104 on a core function at each stage, and achieve high-quality output from the language model 104 in response.

Section E. Illustrative Processing Engines

Figure 14:
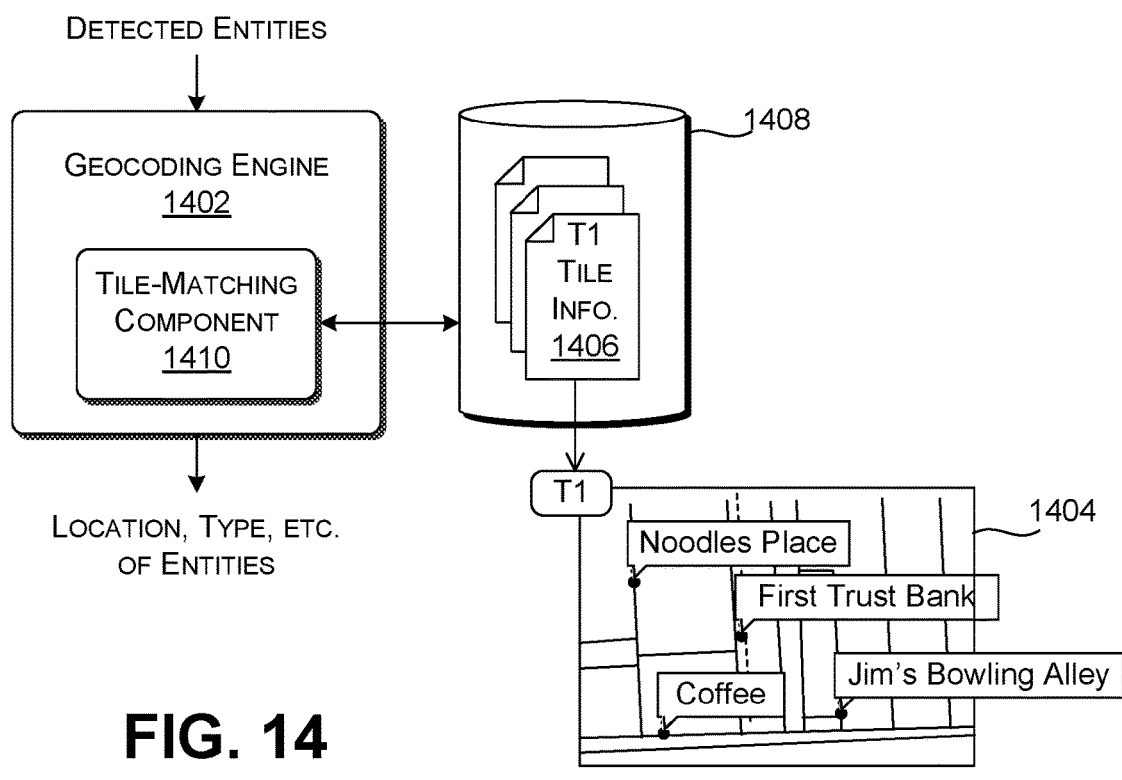
FIG. 14 shows one implementation of a geocoding engine, which is another component of the computing system of FIG. 1.

This section describes illustrative processing engines included in the multi-engine system 106. Beginning with FIG. 14, this figure shows one implementation of a geocoding engine 1402. In this particular case, a map is divided into a plurality of overlapping tiles, each corresponding to a small sub-region of the map (e.g., a 5 km×5 km sub-region of the map). In some cases, each sub-region includes one or more entities. For example, FIG. 14 shows an illustrative tile 1404 that is associated with a sub-region that includes at least four entities. An offline process generates a document for each tile that includes text-based information that describes the entities located in the tile's sub-region, if any. For example, a document 1406 for the tile 1404 specifies the position of each of the entities in the sub-region (e.g., by specifying the entity's longitude and latitude). The tile 1404 optionally expresses any other characteristic of an entity, such as the type of establishment it represents. A data store 1408 stores all the documents, together with an index by which the geocoding engine 1402 is able to explore and retrieve the documents from the data store 1408.

The geocoding engine 1402 includes a tile-matching component 1410 for matching an input query with one or more of the documents in the data store 1408. For example, assume that the language model 104 has previously indicated that the query specifies a name or address of a particular entity. The matching component 1410 searches for a tile having a matching name or address, and then retrieves the position of the entity specified in the matching tile. In some cases, the name specifies a type of business (e.g., a "coffee shop"). If so, the matching component 1410 retrieves all tiles that include this business name, and extracts the locations of these businesses from these tiles (or more specifically, from the documents associated with these tiles). This matching can be appropriately constrained in environment-specific ways. For example, in some cases it is clear from the context of a query that a local citywide search is desired (e.g., as opposed to a statewide, countrywide, or worldwide search). Here, the tile-matching component 1410 limits its search to a radius of 20 km from the present location of the user and/or the known source location and/or the known target location.

The tile-matching component 1410 uses any matching algorithm to perform its matching function, such as a sparse-retrieval algorithm or a dense-retrieval algorithm. A sparse-matching algorithm searches an index to find a candidate document in the data store 1408 having features that match the features of the input information (such as a given name of an entity). A dense-matching algorithm compares a dense vector that represents the input information with dense vectors that represent different target documents. The dense-matching algorithm selects the target document that is closest to the query's dense vector in vector space, e.g., in which proximity is assessed using cosine similarity or any other suitable distance measure.

In other implementations, the computing system 102 relies on a geocoding application hosted by a commercial search engine. Each search engine provides a provider-specific API that that enables a user to enter a geocoding request. For example, Microsoft Corporation of Redmond, Washington provides a publicly-accessible API that allows a user to retrieve location information by specifying the address of an entity, if known. Microsoft Corporation provides another publicly-accessible API that allows a user to retrieve location information by specifying other characteristics of an entity, such as its name. Further, one geocoding system is described in BERKHIN, et al., "A New Approach to Geocoding: BingGC," in SIGSPATIAL '15: Proceedings of the 23rd SIGSPATIAL International Conference on Advances in Geographic Information Systems, Article No. 7, November 2015, 10 pages.

Figure 15:
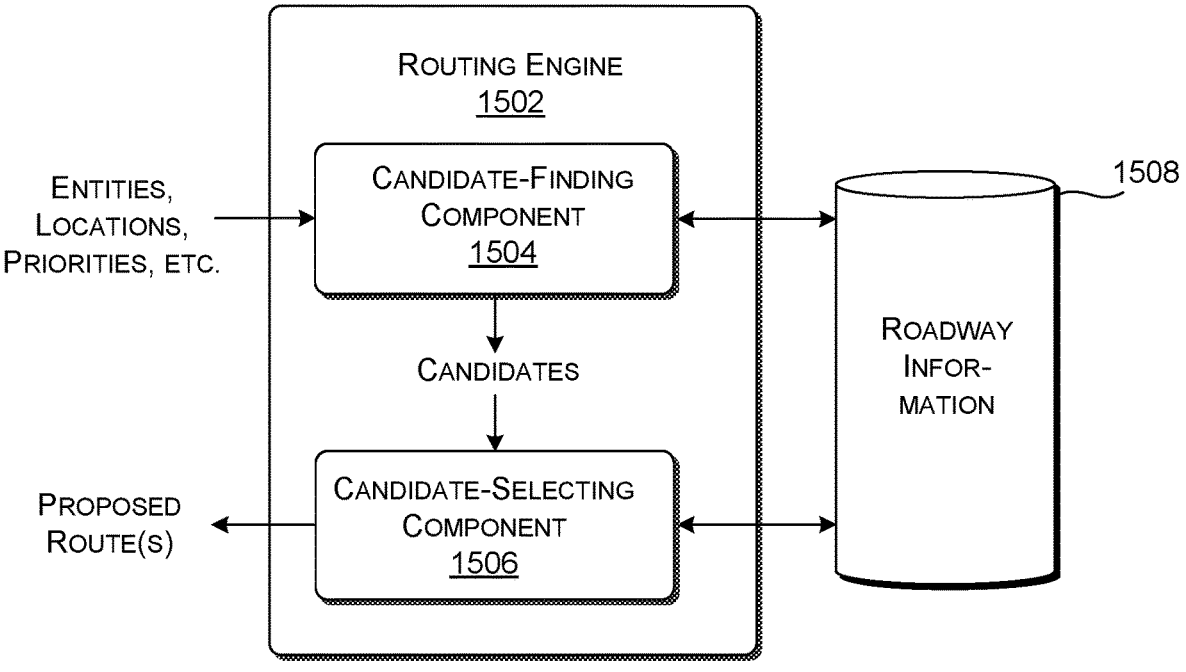
FIG. 15 shows one implementation of a routing engine, which is another component of the computing system of FIG. 1.

FIG. 15 shows one implementation of a routing engine 1502. A candidate-finding component 1504 generates one or more proposed routes that connect the identified entities. For the case in which the query specifies a particular order, the candidate-finding component 1504 selects only candidate routes that link the entities together in the specified order.

In other cases, the instructions fed to the routing engine 1502 do not fully specify all aspects of a desired route. For example, the query specifies a type of business without describing a particular member of this class having a specific location. Alternatively, or in addition, the query does not fully specify the order in which entities are to be connected together. For example, in some cases, the query specifies the starting location and the ending location, and general criteria as to what will constitute an acceptable path between these two locations. In these cases, the candidate-finding component 1504 produces a list of candidate entities that satisfy the query, and that occur within an environment-specific distance of the starting location and/or the ending location and/or the user's present location. The candidate-finding component 1504 constructs candidate routes that encompass all possible ways of combining the qualifying entities. The candidate-finding component 1504 optionally excludes candidate routes that violate algorithm-specific rules, such as routes that require more than a specified amount of backtracking, or routes that include far-flung waypoints (in the context of particular query that has been submitted).

A candidate-selecting component 1506 selects one or more of the candidate routes that have the most favorable characteristics. For example, the candidate-selecting component 1506 selects a subset of the candidate routes that have the shortest travel times, and/or a subset of routes that have the shortest net distances, and/or the subset of routes having location distributions that are most compact, and/or a subset of routes that satisfy other constraints specified by the query. In performing this search, the candidate-selecting component 1506 can exhaustively consider each candidate route, or use any type of searching strategy to more quickly converge on a set of acceptable routes (such as the beam search algorithm). The candidate-selecting component 1506 provides an output result that specifies a final set of selected candidate routes, such as the top three candidate routes. A candidate route is composed of a sequence of line segments that, taken together, link the starting location to the target destination, and which pass through any waypoints specified by the query, explicitly or implicitly.

The routing engine 1502 performs the above tasks by interrogating a data store 1508 that provides roadway information. For instance, the roadway information describes the trajectories of available roads, the characteristics of those roads (including speed limits, stoplights, lane structure, etc.), the current traffic conditions on the roads, and so on. The roadway information constitutes a graph of nodes and edges.

The candidate-finding component 1504 uses any type of routing algorithm to identify a suitable route for traveling between the starting location and the ending location. Examples of routing algorithms include Dijkstra's algorithm, the A* algorithm, the Customizable Route Planning (CRP) algorithm (described, for instance, in DELLING, et al., "Customizable Route Planning," in Proceedings of the 10th International Symposium on Experimental Algorithms, (SEA'11), May 2011, 12 pages), and so on. This is a non-exhaustive list; other implementations use yet other types of routing engines. One commercially available routing engine is provided by BING MAPS, provided by Microsoft Corporation of Redmond, Washington.

Consider the A* algorithm. This algorithm partitions a search space into a plurality of cells. Assume that the algorithm is currently processing a particular cell in the plurality of cells, referred to as the "current cell." The algorithm advances to the adjacent cell that has the lowest F score, and which is designated as "open." The F score is defined by the summation of a G score and an H score. The G score reflects a distance of a cell under consideration with respect to a starting cell. The H score reflects a distance of the cell under consideration to an ending cell. Upon advancing to a next cell, the algorithm marks the next cell as the current cell, and changes its status to "closed." The algorithm advances from cell to cell in this manner until it reaches the ending cell, or until it determines that the ending cell is not reachable.

In those cases in which the query expresses one or more waypoints, the routing engine 1502 provides routing analysis for each leg of a route. For example, in the case of FIG. 8, the routing engine 1502 determines a first route segment from San Francisco to Salinas, a second route segment from Salinas to Bakersfield, and a third route segment from Bakersfield to Los Angeles. In some implementations, the routing engine 138 chooses a route for each segment that is independent of the routing analysis for other segments. In other implementations, the routing engine 138 can take into account global trip factors, as when a user asks for a certain number of EV charging stations from San Francisco to Los Angeles.

Figure 16:
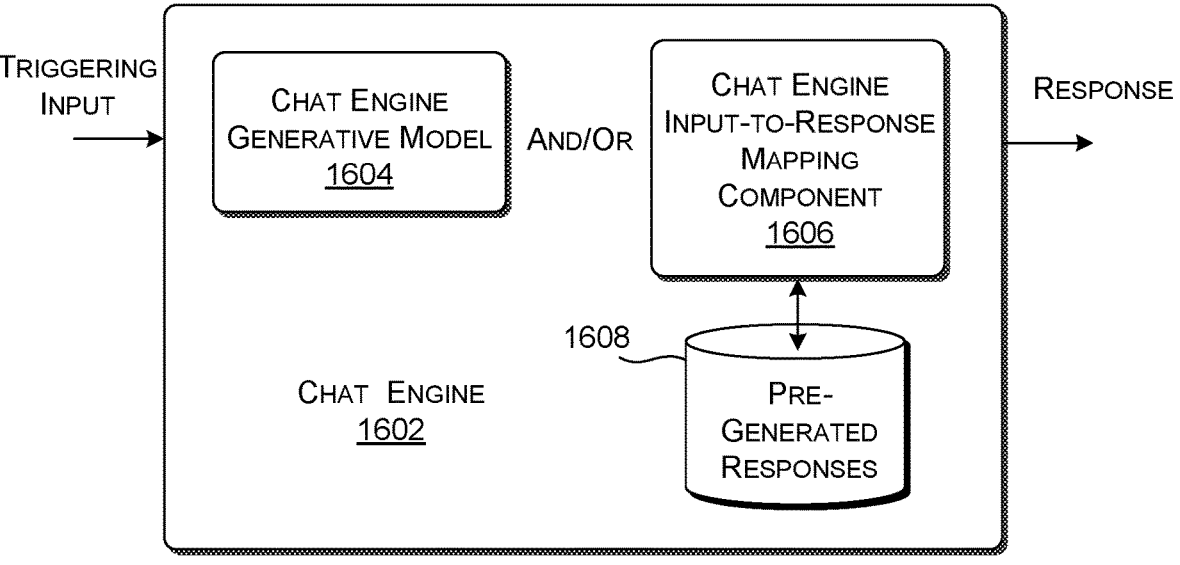
FIG. 16 shows one implementation of a chat engine, which is another component of the computing system of FIG. 1.

FIG. 16 shows a chat engine 1602 for interacting with a user via a text-based dialogue. In some implementations, the chat engine 1602 uses a generative machine-trained model 1604 to transform input information to output information, in which the output information constitutes a response to the input information. In some cases, the input information identifies a particular deficiency of an input query. In some implementations, the generative machine-trained model 1604 is implemented by the language model 104 described above, and is "configured" to perform a chat function by feeding it a function-specific seed prompt. In other implementations, the chat engine 1602 uses a matching component 1606 that searches a data store 1608 for a response that is appropriate to present to the user based on input information. Again, in some cases, the input information identifies a deficiency of the input query. The matching component 1606 uses any matching algorithm to perform its matching function, such as a sparse-retrieval algorithm or a dense-retrieval algorithm.

Although not shown, the image search engine 130 can also match a query (and/or other input information) to an appropriate image using any matching algorithm, such as a sparse-matching algorithm or a dense-retrieval algorithm. Alternatively, the image search engine 130 uses any type of generative machine-trained model to transform input information fed to it to a synthesized output image. For the case in which a travel intent is detected, the output of the image search engine 130 is least one travel-related image. For the case in which an atlas intent is detected, the output of the image search engine 130 is an atlas image.

Figure 17:
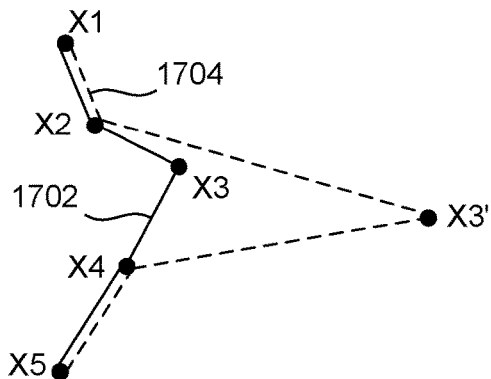
FIG. 17 show one manner of operation of a result-checking component, which is another component of the computing system of FIG. 1.

Although not a processing engine in the multi-engine system 106, FIG. 17 shows one manner of operation of the result-checking component (RCC) 128 shown in FIG. 1. Assume that, in the simplified case of FIG. 17, there are two candidate routes (1702, 1704) that connect the source entity X1 to the target entity X5. The first candidate route 1702 includes a waypoint X3, while the second candidate route 1704 includes a waypoint X3'. For example, assume that the query specifies a stop at a coffee shop, and the entities X3 and X3' represent two nearby coffee shops at different locations.

In some implementations, the RCC 128 determines whether the spatial distribution of waypoints along a route satisfies a prescribed test. For example, the RCC 128 determines the convex hull enclosed by each trajectory, and chooses the candidate route having the smallest convex hull, or at least excludes those trajectories that have anomalously large convex hulls (when compared to the convex hulls of most other trajectories). A convex hull generally refers to the area enclosed by the outer envelope defined by the route's collection of data points. The RCC 128 can use any algorithm to compute the convex hull of each candidate route, such as the Graham scan algorithm. Alternatively, the RCC 128 approximates a convex haul calculation by defining a straight line between the starting location (at X1) and the ending location (at X5), and then determining the average spatial separation of the route's way points from this straight line. Alternatively, or in addition, the RCC 128 excludes any path having a waypoint that is separated from the source-to-destination straight line by more than a prescribed amount.

In addition, or alternatively, the RCC 128 computes the temporal deviation associated with each candidate route from a reference travel time. In some case, the RCC 128 performs this function by computing the travel time $T_0$ to travel in a straight line from the starting location (at entity X1) to the ending location (at entity X5) (based on the hypothesized case in which there is a road that connects these two locations in a straight line). The RCC 128 then computes the travel time required to travel each route. If any route has a deviation from the ideal travel time $T_0$ that is greater than a threshold amount of time given by $\alpha T_0$, then the RCC 128 excludes this candidate route from further consideration, where a is an environment-specific parameter. Note that FIG. 17 only shows a case in which the first candidate route 1702 differs from the second candidate route 1704 by a single waypoint. But the above test takes into consideration the temporal offsets attributed to all of the waypoints along a route's path.

Both of the above tests reveal that the first candidate route 1702 is preferable to the second candidate route 1704, mainly due to the presence of entity X3' in the route 1704, which carries the traveler significantly away from the principal directional flow of the route 1704.

Section F. Illustrative Language Model

Figure 18:
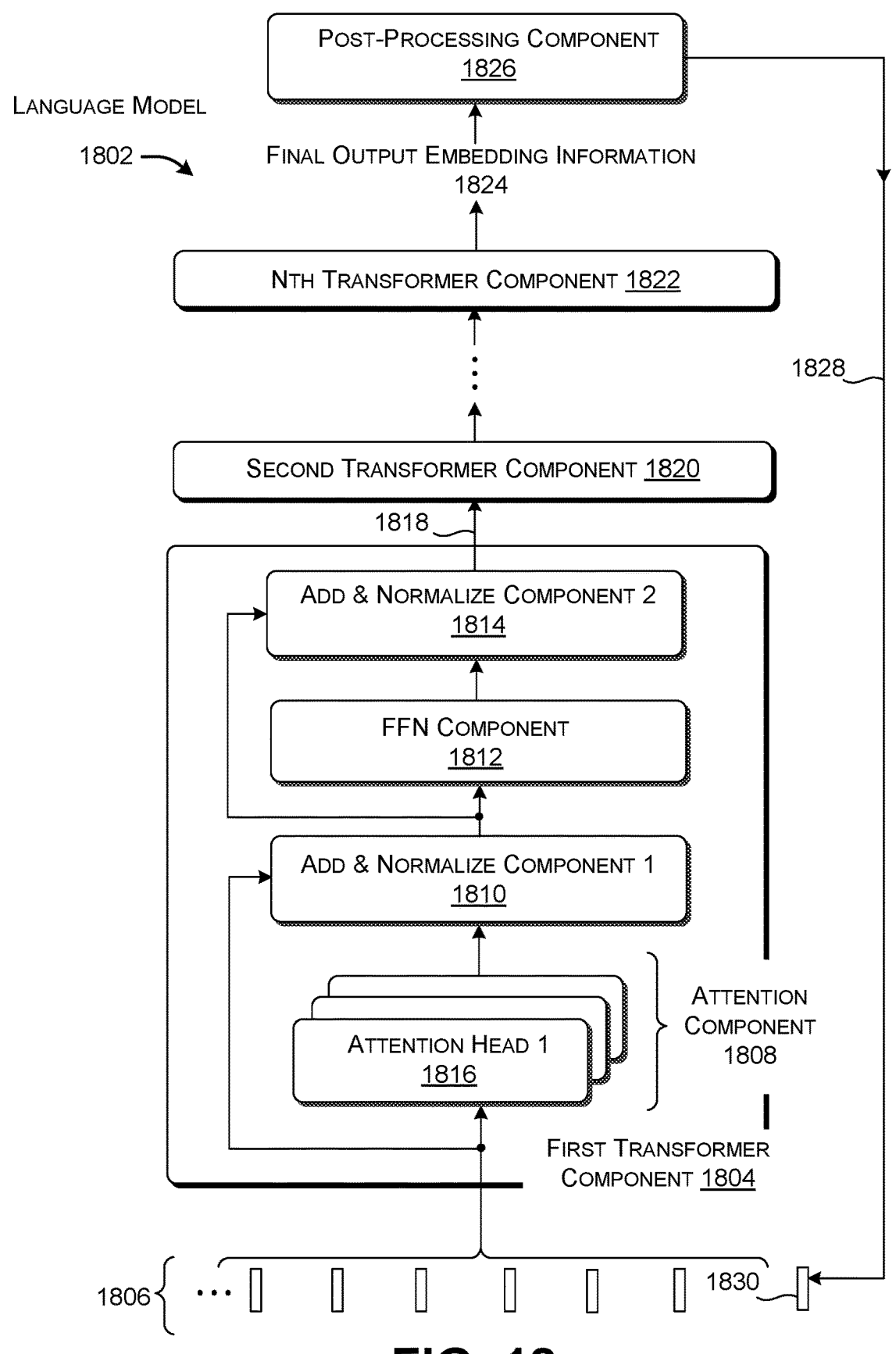
FIG. 18 shows one implementation of the language model of FIG. 1.

FIG. 18 shows a machine-trained language model ("language model") 1802 that represents one implementation of the language model 104 of FIG. 1. The language model 1802 transforms an instance of input text into an instance of output text. When operating in an auto-generative mode, the language model 1802 performs this function in an auto-generative manner, token by token in plural passes. In some examples, the language model 802 is a generative LLM having more than one billion weights, although the functionality described herein can also be implemented using smaller language models.

The language model 1802 is composed, in part, of a pipeline of transformer components, including a first transformer component 1804. FIG. 18 provides details regarding one way to implement the first transformer component 1804. Although not specifically illustrated, other transformer components of the language model 1802 have the same architecture and perform the same functions as the first transformer component 1804 (but are governed by separate sets of weights).

The language model 1802 commences its operation with the receipt of an instance of text, such as the input query 112. A tokenizer breaks the input text into a series of text tokens. In some examples, a "token" refers to a unit of text having any granularity, such as an individual word, a word fragment produced by byte pair encoding (BPE), a character n-gram, a word fragment identified by the WordPiece or Sentence-Piece algorithm, etc. To facilitate explanation, assume that each token corresponds to a complete word. The principles set forth herein, however, are not limited to the processing of text information; in other examples, the language model 1802 operates on any of: audio information, image information, video information, sensor information, finance-related information, and so on, or any combination thereof.

Next, an embedding component (not shown) maps the sequence of tokens into respective token embeddings. For example, the embedding component can produce one-hot vectors that describe the tokens, and can then map the one-hot vectors into the token embeddings using a machine-trained linear transformation. The embedding component then adds position information (and, in some cases, segment information) to the respective token embeddings to produce position-supplemented embedding vectors 1806. The position information added to each token embedding describes the embedding vector's position in the sequence of token embeddings.

The first transformer component 1804 operates on the position-supplemented embedding vectors 1806. In some implementations, the first transformer component 1804 includes, in order, an attention component 1808, a first add-and-normalize component 1810, a feed-forward neural network (FFN) component 1812, and a second add-and-normalize component 1814.

The attention component 1808 performs attention analysis using the following equation:

$$attn(Q, K, V) = \text{Softmax}\left(\frac{QK^T}{\sqrt{d}}\right)V. \qquad (1)$$

The attention component 1808 produces query information Q by multiplying the position-supplemented embedding vectors 1806 by a query weighting matrix $W^Q$. Similarly, the attention component 1808 produces key information K and value information V by multiplying the position-supplemented embedding vectors 1806 by a key weighting matrix $W^K$ and a value weighting matrix $W^V$, respectively. To execute Equation (1), the attention component 1808 takes the dot product of Q with the transpose of K, and then divides the dot product by a scaling factor $\sqrt{d}$, to produce a scaled result. The symbol d represents the dimensionality of Q and K. The attention component 1808 takes the Softmax (normalized exponential function) of the scaled result, and then multiplies the result of the Softmax operation by V, to produce attention output information. More generally stated, the attention component 1808 determines how much emphasis should be placed on each part of input embedding information when interpreting other parts of the input embedding information, and when interpreting the same part. In some cases, the attention component 1808 is said to perform masked attention insofar as the attention component 1808 masks output token information that, at any given time, has not yet been determined. Background information regarding the general concept of attention is provided in Vaswani, et al., "Attention Is All You Need," in 31st Conference on Neural Information Processing Systems (NIPS 20118), 2017, 9 pages.

Note that FIG. 18 shows that the attention component 1808 is composed of plural attention heads, including a representative attention head 1816. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 1808 concatenates the output results of the attention component's separate attention heads, and then multiplies the results of this concatenation by another weight matrix $W^O$.

The add-and-normalize component 1810 includes a residual connection that combines (e.g., sums) input information fed to the attention component 1808 with the output information generated by the attention component 1808. The add-and-normalize component 1810 then normalizes the output information generated by the residual connection, e.g., by normalizing values in the output information based on the mean and standard deviation of those values. The other add-and-normalize component 1814 performs the same functions as the first-mentioned add-and-normalize component 1810. The FFN component 1812 transforms input information to output information using a feed-forward neural network having any number of layers.

The first transformer component 1804 produces output embedding information 1818. A series of other transformer components (1820, . . . , 1822) perform the same functions as the first transformer component 1804, each operating on output embedding information produced by its immediately preceding transformer component. Each transformer component uses its own level-specific set of machine-trained weights. The final transformer component 1822 in the language model 1802 produces final output embedding information 1824.

A post-processing component 1826 performs post-processing operations on the final output embedding information 1824. For example, the post-processing component 1826 performs a machine-trained linear transformation on the final output embedding information 1824, and processes the results of this transformation using a Softmax component (not shown). The language model 1802 uses the output of the post-processing component 1826 to predict the next token in the input sequence of tokens. The language model 1802 performs this task using a greedy selection approach (e.g., by selecting the token having the highest probability), or by using the beam search algorithm (e.g., by traversing a tree that expresses a search space of candidate next tokens).

The language model 1802 can operate in an auto-regressive manner, as indicated by the loop 1828. That is, the language model 1802 appends the predicted token to the end of the sequence of input tokens, to provide an updated sequence of tokens. The predicted token leads to the production of a new position-supplemented vector 1830. In a next pass, the language model 1802 processes the updated sequence of position-supplemented vectors to generate a next predicted token. The language model 1802 repeats the above process until it generates a specified stop token.

The above-described implementation of the langue model 1802 relies on a decoder-only architecture. Other implementations of the language model 1802 use an encoder-decoder transformer-based architecture. Here, a decoder receives encoder output information produced by an encoder, together with decoder input information. Other implementations of the language model 1802 use other kinds of machine-trained models besides, or in addition to, the particular transformer-based architecture shown in FIG. 18. The other machine-trained models include any of CNNs, RNNs, FFNs, stable diffusion models, etc., or any combination thereof.

Section G. Illustrative Processes

FIGS. 19-22 show three processes that represent an overview of the operation of the computing system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 23 and 24.

More specifically, FIG. 19 shows a process 1902 for processing a query that relates to a map. In block 1904, the computing system 102 receives the query. In block 1906, the computing system 102 determines an intent associated with the query using a machine-trained language model (e.g., the language model 104), the machine-trained language model identifying the intent upon submission of the query to the machine-trained language model, and upon being instructed to identify the intent. In block 1908, for at least one processing pipeline, the computing system 102 identifies an entity expressed by the query using the machine-trained language model, the machine-trained language model identifying the entity upon submission of the query to the machine-trained language model, and upon being instructed to identify the entity. In block 1910, the computing system 102 performs further processing of the query using a processing framework (e.g., the multi-engine system 106) having two or more processing engines (e.g., the processing engines 130, 134, and 138) based on the intent that has been determined and the entity that has been identified, to provide an output result that provides map-related information, each processing engine being accessible via an interface provided by the processing engine. In block 1912, the computing system 102 generates a presentation based on the output result. In some examples, the processing framework interacts with one or more data stores that provide map-related information pertaining to a physical roadway network of a region and/or other characteristics pertaining to the region. In some examples, the presentation assists a user in traveling within the region and/or learning about the region.

FIG. 20 shows another process 2002 for processing a query that relates to a map. In block 2004, the computing system 102 receives the query. In block 2006, the computing system 102 determines an intent associated with the query using a machine-trained language model (e.g., the language model 104), the machine-trained language model identifying the intent upon submission of the query to the machine-trained language model, and upon being instructed to identity the intent. In block 2008, the computing system invokes a first processing pipeline for a first intent, and invokes a second processing pipeline for a second intent, the second intent being different than the first intent. In block 2010, for at least one processing pipeline, the computing system 102 identifies an entity expressed by the query using the machine-trained language model, the machine-trained language model identifying the entity upon submission of the query to the machine-trained language model, and upon being instructed to identify the entity. In block 2012, for at least one processing pipeline, the computing system 102 performs further processing of the query using a processing framework (e.g., the multi-engine system 106) having two or more processing engines (e.g., the processing engines 130, 134, and 138) based on the intent that has been determined and the entity that has been identified, to provide an output result that provides map-related information. In block 2014, the computing system 102 generates a presentation based on the output result.

FIGS. 21 and 22 together show yet another process 2102 for processing a map-related query. In block 2104, the computing system 102 receives an original query that relates to a map in a dialogue session having a dialogue history. In block 2106, the computing system 102 augments the original query with information extracted from the dialogue history, to produce an augmented query, the augmenting being performed by a machine-trained language model (e.g., the language model 104), the machine-trained language model performing the augmenting upon being instructed to perform the augmenting. In block 2108, the computing system 102 determines an intent associated with the augmented query using the machine-trained language model upon being instructed to determine the intent. In block 2110, the computing system 102 identifies an entity expressed by the augmented query using the machine-trained language model, the machine-trained language model identifying the entity upon being instructed to identify the entity. In block 2112, based on the outcomes of blocks 2106, 2108, and 2110, the computing system 102 performs further processing of the augmented query using a processing framework (e.g., the multi-engine system 106) having two or more processing engines (e.g., the processing engines 130, 134, and 138). One of the two or more processing engines is a geocoding engine (e.g., the geocoding engine 134) that determines a location associated with the entity. Another of the two or more processing engines is a routing engine (e.g., the routing engine 138) that proposes one or more routes that link identified entities. Another of the two or more processing engines is an image search engine (e.g., the image search engine 130) that retrieves an image based on the augmented query.

Advancing to FIG. 22, in block 2202, the computing system 102 ascertains whether additional information is needed to provide an answer to the original query. In block 2204, the computing system 102 collects the additional information for a case in which the additional information is determined to be needed. In block 2206, the computing system 102 receives the additional information, and repeats blocks 2106, 2108, 2110, 2112, and 2204 at least one time, until an acceptable output result is produced. In block 2208, the computing system 102 generates a presentation based on the output result, the output result providing map-related information.

Section H. Illustrative Computing Functionality

FIG. 23 shows computing equipment 2302 that, in some implementations, is used to implement the computing system 102 of FIG. 1. The computing equipment 2302 includes a set of local devices 2304 coupled to a set of servers 2306 via a computer network 2308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 2308 is implemented as a local area network, a wide area network (e.g., the Internet), one or more point-to-point links, or any combination thereof.

The overlapping box in FIG. 23 indicates that the functionality of the computing system 102 is capable of being spread across the local devices 2304 and/or the servers 2306 in any manner. For instance, in some cases, each local device, or a group of affiliated local devices, implements the entirety the computing system 102. In other implementations, the servers 2306 implement the entirety of the computing system 102. Here, an individual user interacts with the servers 2306 via a browser application or other local functionality provided by a local device. In other implementations, the functions of the computing system 102 are distributed between each local device and the servers 2306. For example, in one case, the servers 2306 implement the language model 104, which may include billions of weights, and is therefore relatively large. Each local device implements the management component 108 and at least some of the processing engines in the multi-engine system 106.

FIG. 24 shows a computing system 2402 that, in some implementations, is used to implement any aspect of the mechanisms set forth in the above-described figures. For instance, in some implementations, the type of computing system 2402 shown in FIG. 24 is used to implement any local computing device or any server shown in FIG. 23. In all cases, the computing system 2402 represents a physical and tangible processing mechanism.

The computing system 2402 includes a processing system 2404 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), and/or one or more Tensor Processing Units (TPUs), etc. More generally, any processor corresponds to a general-purpose processing unit or an application-specific processor unit.

The computing system 2402 also includes computer-readable storage media 2406, corresponding to one or more computer-readable media hardware units. The computer-readable storage media 2406 retains any kind of information 2408, such as machine-readable instructions, settings, model weights, and/or other data. In some implementations, the computer-readable storage media 2406 includes one or more solid-state devices, one or more magnetic hard disks, one or more optical disks, magnetic tape, etc. Any instance of the computer-readable storage media 2406 uses any technology for storing and retrieving information. Further, any instance of the computer-readable storage media 2406 represents a fixed or removable unit of the computing system 2402. Further, any instance of the computer-readable storage media 2406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 2402 utilizes any instance of the computer-readable storage media 2406 in different ways. For example, in some implementations, any instance of the computer-readable storage media 2406 represents a hardware memory unit (such as random access memory (RAM)) for storing information during execution of a program by the computing system 2402, and/or a hardware storage unit (such as a hard disk) for retaining/archiving information on a more permanent basis. In the latter case, the computing system 2402 also includes one or more drive mechanisms 2410 (such as a hard drive mechanism) for storing and retrieving information from an instance of the computer-readable storage media 2406.

In some implementations, the computing system 2402 performs any of the functions described above when the processing system 2404 executes computer-readable instructions stored in any instance of the computer-readable storage media 2406. For instance, in some implementations, the computing system 2402 carries out computer-readable instructions to perform each block of the processes described in with reference to FIGS. 19-22. FIG. 24 generally indicates that hardware logic circuitry 2412 includes any combination of the processing system 2404 and the computer-readable storage media 2406.

In addition, or alternatively, the processing system 2404 includes one or more other configurable logic units that perform operations using a collection of logic gates. For instance, in some implementations, the processing system 2404 includes a fixed configuration of hardware logic gates, e.g., that are created and set at the time of manufacture, and thereafter unalterable. In addition, or alternatively, the processing system 2404 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FP-GAs), etc. In these implementations, the processing system 2404 effectively incorporates a storage device that stores computer-readable instructions, insofar as the configurable logic units are configured to execute the instructions and therefore embody or store these instructions.

In some cases (e.g., in the case in which the computing system 2402 represents a user computing device), the computing system 2402 also includes an input/output interface 2414 for receiving various inputs (via input devices 2416), and for providing various outputs (via output devices 2418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 2420 and an associated graphical user interface presentation (GUI) 2422. The display device 2420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 2402 also includes one or more network interfaces 2424 for exchanging data with other devices via one or more communication conduits 2426. One or more communication buses 2428 communicatively couple the above-described units together.

The communication conduit(s) 2426 is implemented in any manner, e.g., by a local area computer network, a wide area computer network (e.g., the Internet), point-to-point connections, or any combination thereof. The communication conduit(s) 2426 include any combination of hardwired links, wireless links, routers, gateway functionality, name servers, etc., governed by any protocol or combination of protocols.

FIG. 24 shows the computing system 2402 as being composed of a discrete collection of separate units. In some cases, the collection of units corresponds to discrete hardware units provided in a computing device chassis having any form factor. FIG. 24 shows illustrative form factors in its bottom portion. In other cases, the computing system 2402 includes a hardware logic unit that integrates the functions of two or more of the units shown in FIG. 24. For instance, in some implementations, the computing system 2402 includes a system on a chip (SoC or SOC), corresponding to an integrated circuit that combines the functions of two or more of the units shown in FIG. 24.

The following summary provides a set of illustrative examples of the technology set forth herein.

(A1) According to one aspect, a method (e.g., the process 1902) is described for processing a query that relates to a map (e.g., the query 104). The method includes: receiving (e.g., in block 1904) the query; determining (e.g., in block 1906) an intent associated with the query using a machine-trained language model (e.g., the language model 104), the machine-trained language model identifying the intent upon submission of the query to the machine-trained language model, and upon being instructed to identify the intent; for at least one processing pipeline, identifying (e.g., in block 1908) an entity expressed by the query using the machine-trained language model, the machine-trained language model identifying the entity upon submission of the query to the machine-trained language model, and upon being instructed to identify the entity; performing (e.g., in block 1910) further processing of the query using a processing framework (e.g., the multi-engine system 106) having two or more processing engines (e.g., the engines 130, 134, and 138) based on the intent that has been determined and the entity that has been identified, to provide an output result that provides map-related information, each processing engine being accessible via an interface provided by the processing engine; and generating (e.g., in block 1912) a presentation based on the output result.

In some examples, the processing framework interacts with one or more data stores that provide map-related information pertaining to a physical roadway network of a region and/or other characteristics pertaining to the region.

In some examples, the presentation assists a user in traveling within the region and/or learning about the region.

(A2) According to some implementations of the method of A1, the machine-trained language model is instructed to perform each of the determining and the identifying by generating a seed prompt that describes a particular task, and sending the seed prompt to the machine-trained language model. The seed prompt also specifies a particular output format to be used by the machine-trained language model to present results of processing performed by the machine-trained language model.

(A3) According some implementations of the methods of A1 or A2, the operation of determining an intent determines two or more intents associated with the query.

(A4) According to some implementations of any of the methods of A1-A3, the operation of identifying an entity includes determining two or more entities expressed by the query.

(A5) According to some implementations of any of the methods of A1-A3, the entity has a single location.

(A6) According to some implementations of any of the methods of A1-A3, the query refers to the entity by describing a class associated with the entity, there being two or more specific entities in the class having different respective locations.

(A7) According to some implementations of any of the methods of A1-A6, the query is an original query, wherein the original query is submitted in a dialogue session having a dialogue history. The method further includes using the machine-trained language model to augment the original query with information extracted from the dialog history, to produce an augmented query, the machine-trained language model augmenting the original query upon submission of the original query to the machine-trained language model, and upon being instructed to augment the original query.

(A8) According to some implementations of any of the methods of A1-A7, the operation of identifying an entity includes determining two or more entities expressed by the query. The method further includes using the machine-trained language model to classify a particular entity, of the two or more entities, as a primary entity or a secondary entity, the machine-trained language model deciding between the primary entity and the secondary entity upon submission of the query to the machine-trained language model, and upon being instructed to perform the deciding. The primary entity has a higher priority than the secondary entity, indicating that including the primary entity in a proposed route is more important than including a specific instantiation of the secondary entity in the proposed route.

(A9) According to some implementations of any of the methods of A1-A8, the query is a first query, and the method further includes generating an output message using the machine-trained language model that conveys a request to supply a second query that provides additional information, beyond information that is imparted by the first query, the machine-trained language model generating the output message upon being instructed to do so.

(A10) According to some implementations of any of the methods of A1-A9, the identifying further includes using the machine-trained language model to determine an order in which entities referenced by the query are to be connected, or to indicate that an order does not apply to the entities, the machine-trained language model determining the order upon submission of the query and upon being instructed to determine the order.

(A11) According to some implementations of any of the methods of A1-A10, the operation of performing further processing also determines a location associated with the entity using a geocoding engine.

(A12) According to some implementations of any of the methods of A1-A11, the intent is an implicit intent that indirectly refers to the entity. The method further includes generating a response to the query using the machine-trained language model upon submission of the query to the machine-trained language model, the response representing an answer to the query. The identifying an entity is performed on a basis of the query and the response.

(A13) According to some implementations of any of the methods of A1-A12, the intent is a route-finding intent that expresses a request to find a route over a physical space. The operation of identifying an entity includes identifying two or more entities expressed by the query using the machine-trained language model. The operation of performing further processing includes: determining a location associated with each entity of the two or more entities using a geocoding engine; and identifying one or more proposed routes that connect the two more entities using a routing engine, based on an output result of the geocoding engine.

(A14) According to some implementations of the method of A13, the method further includes validating each proposed route by determining whether the proposed route has a spatial distribution of locations that satisfies a prescribed test, and/or determining whether the proposed route has a travel time that is within a prescribed temporal deviation from a reference travel time.

(A15) According to some implementations of any of the methods of A1-A14, the intent is a travel intent or an atlas intent that expresses an intent to retrieve an image. The operation of performing further processing includes retrieving an image from a data store that pertains to a topic expressed by the query. The operation of generating includes presenting an interactive map pertaining to the query, and presenting the image that has been retrieved in prescribed proximity to the interactive map.

In yet another aspect, some implementations of the technology described herein include a computing system (e.g., the computing system 2402) that includes a processing system (e.g., the processing system 2404) having a processor. The computing system also includes a storage device (e.g., the computer-readable storage media 2406) for storing computer-readable instructions (e.g., information 2408). The processing system executes the computer-readable instructions to perform any of the methods described herein (e.g., any individual method of the methods of A1-A15).

In yet another aspect, some implementations of the technology described herein include a computer-readable storage medium (e.g., the computer-readable storage media 2406) for storing computer-readable instructions (e.g., the information 2408). A processing system (e.g., the processing system 2404) executes the computer-readable instructions to perform any of the operations described herein (e.g., the operations in any individual method of the methods of A1-A15).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 2412 of FIG. 24. The term "logic" likewise encompasses various physical and tangible mechanisms for performing a task. For instance, each processing-related operation illustrated in the flowcharts of FIGS. 19-22 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing a query that relates to a map using a control computer program that orchestrates functions performed by a computing system, comprising:

receiving the query;

generating a prompt to submit to a machine-trained language model, the prompt including a series of tokens, the prompt expressing the query and describing a task that the machine-trained language model is being asked to perform;

sending the prompt to the machine-trained language model;

receiving a response generated by the machine-trained language model based on the prompt, the response identifying one or more intents of a predetermined set of intents that are relevant to the query; and in a multiplexing operation, invoking a particular processing pipeline based on the one or more intents identified by the machine-trained model, wherein the particular processing pipeline is one of plural context-specific processing pipelines executed by the control computer program, wherein at least one context-specific processing pipeline of the plural context-specific pipelines calls the machine-trained language model to classify each of two or more entities specified by the query as a primary entity or a secondary entity, wherein the primary entity has a higher priority than the secondary entity, indicating that the machine-trained language model is to treat the primary entity as an anchor, and then select the secondary entity from among entities that are located near the primary entity, wherein at least one context-specific processing pipeline of the plural context-specific pipelines includes: identifying, using a routing engine of a multi-engine system, one or more proposed routes based on the query; and validating each proposed route by determining whether the proposed route has a spatial distribution of locations that satisfies a prescribed test, and/or determining whether the proposed route has a travel time that is within a prescribed temporal deviation from a reference travel time, and wherein at least one context-specific processing pipeline of the plural context-specific pipelines generates an interactive map pertaining to the query, and presents an image that has been retrieved in prescribed proximity to the interactive map.

2. The method of claim 1, further comprising generating a seed prompt that describes a particular task to be performed by the machine-trained language model, and sending the seed prompt to the machine-trained language model, the seed prompt also specifying a particular output format to be used by the machine-trained language model to present results of processing performed by the machine-trained language model.

3. The method of claim 1, wherein the query refers to a particular entity by describing a class associated with the particular entity, there being two or more specific entities in the class having different respective locations, and wherein the machine-trained language model is instructed to interpret the particular entity as a secondary entity.

4. The method of claim 1,
wherein the query is submitted in a dialogue session having a dialogue history,
wherein the method further comprises calling the machine-trained language model to augment the query with information extracted from the dialog history, to produce an augmented query, and
wherein the method further comprises submitting the augmented query to machine-trained language model.

5. The method of claim 1, wherein the method further comprises generating an output message using the machine-trained language model that conveys a request to supply another query that provides additional information, beyond information that is imparted by the query that is originally received.

6. The method of claim 1, wherein the computer control program further includes calling the machine-trained language model to determine an order in which entities referenced by the query are to be connected, or to indicate that an order does not apply to the entities referenced by the query.

7. The method of claim 1, wherein the the computer control program determines a location associated with a particular entity referenced by the query by calling a geocoding engine of the multi-engine system.

8. The method of claim 1, wherein the computer control program identifies a particular entity referenced by the query on a basis of the query and/or an answer to the query generated by the machine-trained language model.

9. The method of claim 1,
wherein the one or more intents include a route-finding intent that expresses a request to find a route over a physical space,
wherein the control computer program further includes:
determining a location associated with each entity referenced by the query a geocoding engine of the multi-engine system; and
identifying the one or more proposed routes based on an output result of the geocoding engine.

10. The method of claim 1,
wherein the one or more intents include a travel intent or an atlas intent that expresses an intent to retrieve an image, and
wherein the computer control program includes retrieving the image from a data store that pertains to a topic expressed by the query.

11. A computing system for processing a query that relates to a map, comprising:
an instruction data store for storing computer-readable instructions, the computer-readable instructions providing a control computer program that orchestrates functions performed by the computing system; and
a processing system for executing the computer-readable instructions in the data store, to perform operations including:
receiving the query;

generating a prompt to submit to a machine-trained language model, the prompt including a series of tokens, the prompt expressing the query and describing a task that the machine-trained language model is being asked to perform;
sending the prompt to the machine-trained language model;
receiving a response generated by the machine-trained language model based on the prompt, the response identifying one or more intents of a predetermined set of intents that are relevant to the query; and
in a multiplexing operation, invoking a particular processing pipeline based on the one or more intents identified by the machine-trained model, wherein the particular processing pipeline is one of plural context-specific processing pipelines executed by the control computer program,
wherein at least one context-specific processing pipeline of the plural context-specific pipelines calls the machine-trained language model to classify each of two or more entities specified by the query as a primary entity or a secondary entity, wherein the primary entity has a higher priority than the secondary entity, indicating that the machine-trained language model is to treat the primary entity as an anchor, and then select the secondary entity from among entities that are located near the primary entity,
wherein at least one context-specific processing pipeline of the plural context-specific pipelines includes: identifying, using a routing engine of a multi-engine system, one or more proposed routes based on the query; and validating each proposed route by determining whether the proposed route has a spatial distribution of locations that satisfies a prescribed test, and/or determining whether the proposed route has a travel time that is within a prescribed temporal deviation from a reference travel time, and
wherein at least one context-specific processing pipeline of the plural context-specific pipelines generates an interactive map pertaining to the query, and presents an image that has been retrieved in prescribed proximity to the interactive map.

12. The computing system of claim 11, wherein the computer control program identifies a particular entity referenced by the query on a basis of the query and/or the an answer to the query generated by the machine-trained language model.

13. The computing system of claim 11,
wherein the one or more intents generated by the machine-trained language model include a route-finding intent that expresses a request to find a route over a physical space,
wherein the control computer program further includes:
determining a location associated with each entity referenced by the query using a geocoding engine of the multi-engine system; and
identifying the one or more proposed routes based on an output result of the geocoding engine.

14. The computing system of claim 11, wherein the one or more intents include a travel intent that expresses an intent to retrieve a travel-related image that provides assistance when traveling in a particular region, or an atlas intent that conveys scientific, historical, and/or news-related information about the particular region.

15. A computer-readable storage medium for storing computer-readable instructions, a processing system executing the computer-readable instructions to perform operations, the operations comprising:

receiving the query;

generating a prompt to submit to a machine-trained language model, the prompt including a series of tokens, the prompt expressing the query and describing a task that the machine-trained language model is being asked to perform;

sending the prompt to the machine-trained language model;

receiving a response generated by the machine-trained language model based on the prompt, the response identifying one or more intents of a predetermined set of intents that are relevant to the query; and in a multiplexing operation, invoking a particular processing pipeline based on the one or more intents identified by the machine-trained model, wherein the particular processing pipeline is one of plural context-specific processing pipelines executed by the control computer program, wherein at least one context-specific processing pipeline of the plural context-specific pipelines calls the machine-trained language model to classify each of two or more entities specified by the query as a primary entity or a secondary entity, wherein the primary entity has a higher priority than the secondary entity, indicating that the machine-trained language model is to treat the primary entity as an anchor, and then select the secondary entity from among entities that are located near the primary entity, wherein at least one context-specific processing pipeline of the plural context-specific pipelines includes: identifying, using a routing engine of a multi-engine system, one or more proposed routes based on the query; and validating each proposed route by determining whether the proposed route has a spatial distribution of locations that satisfies a prescribed test, and/or determining whether the proposed route has a travel time that is within a prescribed temporal deviation from a reference travel time, and wherein at least one context-specific processing pipeline of the plural context-specific pipelines generates an interactive map pertaining to the query, and presents an image that has been retrieved in prescribed proximity to the interactive map.

* * * * *